(12) United States Patent
Ichikawa

(10) Patent No.: US 12,045,002 B2
(45) Date of Patent: Jul. 23, 2024

(54) FILM CARTRIDGE, FILM UNIT, AND LAYER TRANSFER DEVICE

(71) Applicant: BROTHER KOGYO KABUSHIKI KAISHA, Nagoya (JP)

(72) Inventor: Tomoya Ichikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 368 days.

(21) Appl. No.: 17/356,670

(22) Filed: Jun. 24, 2021

(65) Prior Publication Data

US 2021/0318656 A1    Oct. 14, 2021

Related U.S. Application Data

(63) Continuation of application No. PCT/JP2019/020785, filed on May 24, 2019.

(30) Foreign Application Priority Data

Dec. 28, 2018  (JP) .................................. 2018-246433

(51) Int. Cl.
  *G03G 21/16*    (2006.01)
  *B32B 37/00*    (2006.01)
  (Continued)

(52) U.S. Cl.
  CPC .......... *G03G 21/16* (2013.01); *B32B 37/0046* (2013.01); *B32B 37/223* (2013.01);
  (Continued)

(58) Field of Classification Search
  CPC .... G03G 21/16; G03G 15/6582; G03G 15/65; G03G 15/6502; G03G 15/6508;
  (Continued)

(56) References Cited

U.S. PATENT DOCUMENTS 5,450,102 A    9/1995 Ishida et al.
5,956,067 A    9/1999 Isono et al.
(Continued)

FOREIGN PATENT DOCUMENTS

CN    101870207 A    10/2010
CN    103228452 A    7/2013
(Continued)

OTHER PUBLICATIONS

First Office Action issued in corresponding Chinese Patent Application No. 201980086447.6, dated May 9, 2022.
(Continued)

*Primary Examiner* — Sandra Brase
(74) *Attorney, Agent, or Firm* — Merchant & Gould P.C.

(57) ABSTRACT

Provided are a film cartridge, a film unit, and a layer transfer device capable of restraining a supported layer including a transfer layer from being touched by an operator and restraining the supported layer remaining on the supporting layer remaining on a supporting layer from coming off. A film cartridge includes a supply reel on which a multilayer film including a supported layer with a transfer layer included therein and a supporting layer is wound, and a take-up reel on which to take up the multilayer film. The multilayer film is wound on a supply shaft in such a manner that the supported layer is in contact with the supply shaft, and the multilayer film is wound on the take-up shaft in such a manner that the supported layer is in contact with the take-up shaft.

44 Claims, 13 Drawing Sheets

(51) Int. Cl.
  *B32B 37/22* (2006.01)
  *B32B 37/26* (2006.01)
  *B32B 38/18* (2006.01)
  *B65C 9/18* (2006.01)
  *G03G 15/00* (2006.01)

(52) U.S. Cl.
  CPC .............. *B32B 38/18* (2013.01); *B65C 9/18* (2013.01); *G03G 15/6582* (2013.01); *B32B 2037/0061* (2013.01); *B32B 2037/268* (2013.01); *B32B 2307/412* (2013.01); *G03G 15/65* (2013.01); *G03G 15/6502* (2013.01); *G03G 15/6508* (2013.01); *G03G 15/6511* (2013.01); *G03G 15/6517* (2013.01)

(58) Field of Classification Search
  CPC .......... G03G 15/6511; G03G 15/6517; G03G 2215/00801; B32B 37/0046; B32B 37/223; B32B 38/18; B32B 2037/0061; B32B 2037/268; B32B 2307/412; B65C 9/18
  See application file for complete search history.

(56) References Cited

U.S. PATENT DOCUMENTS

| | | | |
|---|---|---|---|
| 6,115,568 | A | 9/2000 | Sameshima |
| 8,568,044 | B2 | 10/2013 | Murata et al. |
| 8,810,619 | B2 | 8/2014 | Kaneoya et al. |
| 8,957,930 | B2 | 2/2015 | Aihara |
| 9,075,379 | B2 | 7/2015 | Egawa |
| 9,205,692 | B2 | 12/2015 | Suzuki |
| 9,381,764 | B2 | 7/2016 | Ohta |
| 9,498,996 | B2 | 11/2016 | Ohta |
| 9,656,478 | B2 | 5/2017 | Ohta |
| 10,668,750 | B2 | 6/2020 | Kodama et al. |
| 11,493,873 | B2 | 11/2022 | Ichikawa et al. |
| 2001/0046399 | A1 | 11/2001 | Hayashi |
| 2002/0021926 | A1 | 2/2002 | Yamamoto et al. |
| 2002/0024583 | A1 | 2/2002 | Hayashi |
| 2004/0007331 | A1 | 1/2004 | Tamai et al. |
| 2007/0269247 | A1 | 11/2007 | Motoki |
| 2010/0272488 | A1 | 10/2010 | Murata et al. |
| 2012/0027494 | A1 | 2/2012 | Kawashima et al. |
| 2012/0251174 | A1* | 10/2012 | Shirai ............... G03G 15/6585 399/132 |
| 2013/0250026 | A1 | 9/2013 | Kaneoya et al. |
| 2014/0140746 | A1 | 5/2014 | Egawa |
| 2014/0292991 | A1 | 10/2014 | Aihara |
| 2015/0145940 | A1 | 5/2015 | Suzuki |
| 2015/0283834 | A1 | 10/2015 | Ohta |
| 2016/0250874 | A1 | 9/2016 | Ohta |
| 2017/0021637 | A1 | 1/2017 | Ohta |
| 2017/0257508 | A1* | 9/2017 | Kawasaki ......... G03G 15/6582 |
| 2019/0023038 | A1 | 1/2019 | Kodama et al. |
| 2021/0311426 | A1 | 10/2021 | Ichikawa et al. |
| 2021/0318656 | A1 | 10/2021 | Ichikawa |

FOREIGN PATENT DOCUMENTS

| | | |
|---|---|---|
| CN | 103832865 A | 6/2014 |
| CN | 104070862 A | 10/2014 |
| CN | 104507695 A | 4/2015 |
| CN | 104647911 A | 5/2015 |
| CN | 106976325 A | 7/2017 |
| CN | 108778762 A | 11/2018 |
| JP | 3-56349 A | 3/1991 |
| JP | 4-71883 A | 3/1992 |
| JP | 6-54667 U | 7/1994 |
| JP | 6-218960 A | 8/1994 |
| JP | 7-125270 A | 5/1995 |
| JP | 7-290685 A | 11/1995 |
| JP | 8-318614 A | 12/1996 |
| JP | 9-314968 A | 12/1997 |
| JP | 10-301464 A | 11/1998 |
| JP | 2001-1619 A | 1/2001 |
| JP | 2001-30465 A | 2/2001 |
| JP | 2001-30466 A | 2/2001 |
| JP | 2001-130133 A | 5/2001 |
| JP | 2001-277624 A | 10/2001 |
| JP | 2002-120960 A | 4/2002 |
| JP | 2004-42943 A | 2/2004 |
| JP | 2005-35050 A | 2/2005 |
| JP | 2006-52006 A | 2/2006 |
| JP | 2007-136893 A | 6/2007 |
| JP | 2008-1087 A | 1/2008 |
| JP | 2009-119631 A | 6/2009 |
| JP | 4447870 B2 | 4/2010 |
| JP | 2010-253846 A | 11/2010 |
| JP | 2012-30946 A | 2/2012 |
| JP | 2017-113909 A | 6/2017 |
| JP | 2020-109016 A | 7/2020 |

OTHER PUBLICATIONS

First Office Action issued in corresponding Japanese Patent Application No. 2019-098136, dated Dec. 6, 2022.
First Office Action issued in corresponding Japanese Patent Application No. 2019-008883, dated Dec. 27, 2022.
First Office Action issued in corresponding Japanese Patent Application No. 2019-011989, dated Feb. 7, 2023.
International Search Report issued in PCT/JP2019/020785, dated Aug. 6, 2019.
Second Office Action issued in corresponding Japanese Patent Application No. 2019-098136, dated May 23, 2023.
International Preliminary Report on Patentability and Written Opinion of the International Searching Authority issued in corresponding International Patent Application No. PCT/JP2019/020785, dated Jun. 16, 2021.
International Preliminary Report on Patentability and Written Opinion of the International Searching Authority issued in International Patent Application No. PCT/JP2019/020693, dated Jun. 16, 2021.
International Search Report issued in International Patent Application No. PCT/JP2019/020693, dated Jul. 2, 2019.
Extended European Search Report issued in counterpart European application 19905733.2, dated Oct. 12, 2022.
Office Action issued in corresponding Japanese Application No. 2023-143355, Mar. 19, 2024.

* cited by examiner

FIG.3
(a)
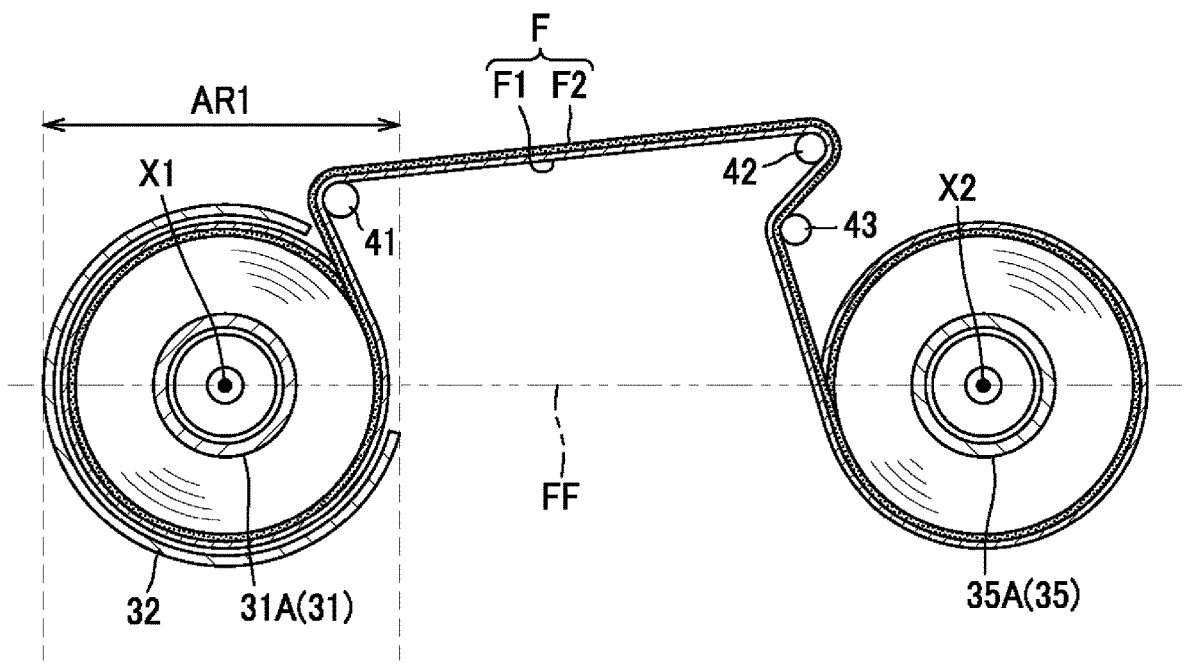
(b)
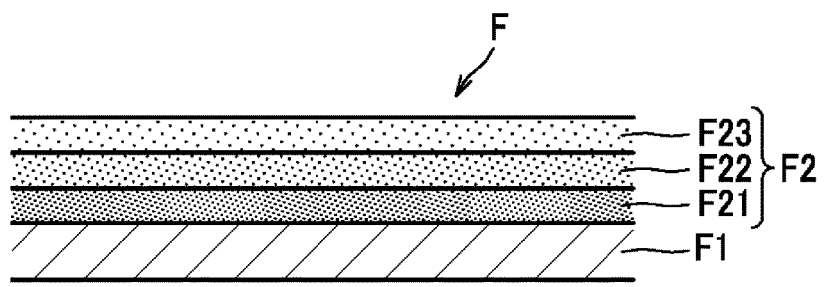

FIG.9
(a)
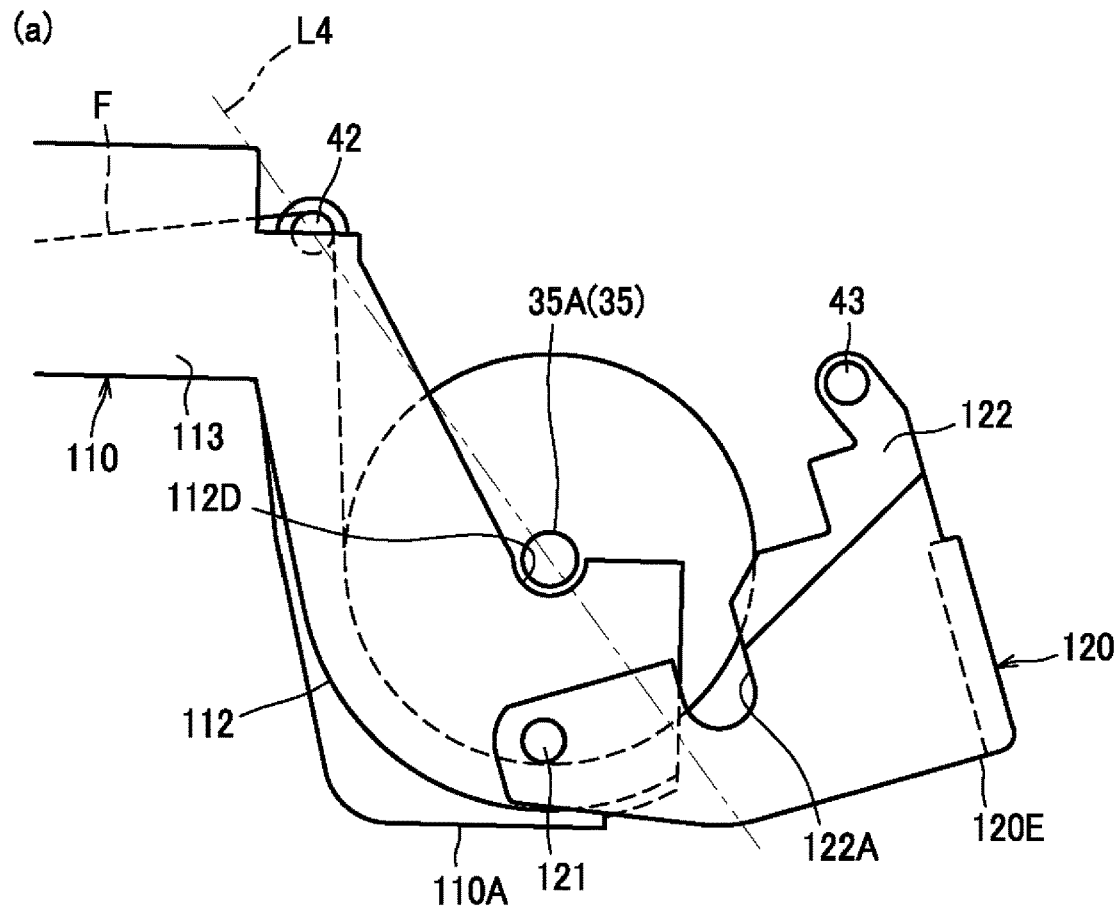
(b)
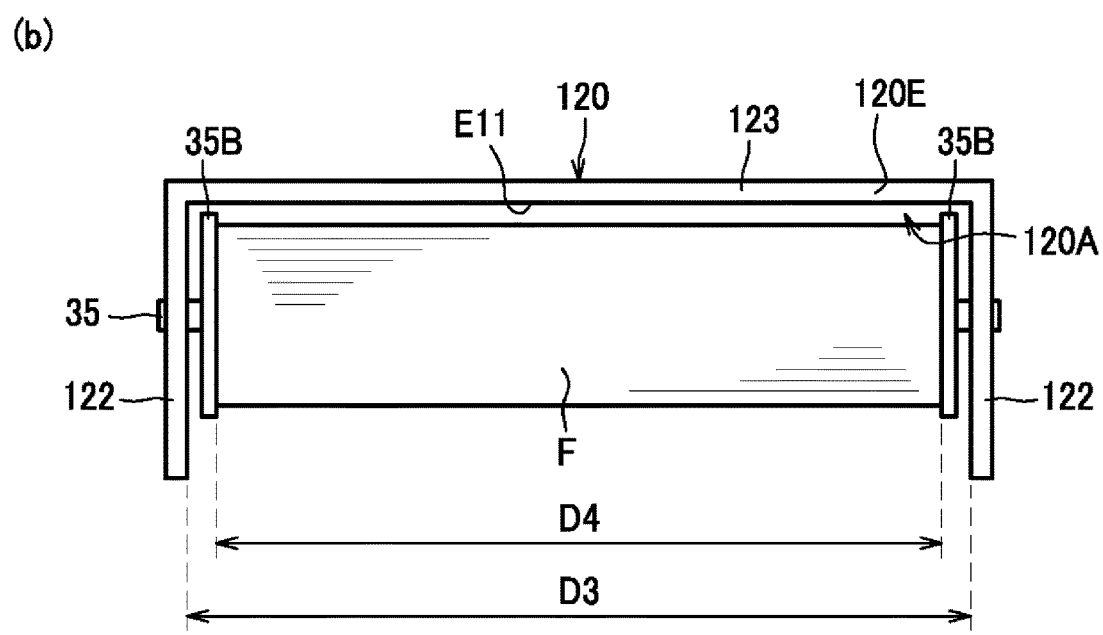

FILM CARTRIDGE, FILM UNIT, AND LAYER TRANSFER DEVICE

CROSS-REFERENCE TO RELATED APPLICATION(S)

This application is a continuation application of International Application No. PCT/JP2019/020785 filed on May 24, 2019, and claims priority from Japanese Patent Application No. 2018-246433 filed on Dec. 28, 2018, the disclosure of which is incorporated herein by reference in their entirety.

TECHNICAL FIELD

This disclosure relates to a film cartridge, a film unit, and a layer transfer device for transferring a transfer layer onto a toner image formed on a sheet.

BACKGROUND ART

A film cartridge comprising a supply reel and a take-up reel on which a multilayer film having a transfer layer included therein is wound, and configured to be installable into and removable from a layer transfer device is hitherto known in the art. The multilayer film further includes a supporting layer that supports the transfer layer. The multilayer film is wound on the supply reel and the take-up reel in such a manner that the supporting layer is in contact with the supply reel and the take-up reel. Accordingly, on the outer surface of a roll of the multilayer film wound on the supply reel, the supported layer is located and exposed to outside, whereas on the outer surface of a roll of the multilayer film wound on the take-up reel, the supported layer is located and exposed to outside.

SUMMARY

However, the prior art entails a risk that the operator would touch the supported layer and damage the supported layer including the transfer layer during an operation of attaching the supply reel with the multilayer film wound thereon to a holder of the film unit, because the supported layer is located on the outer surface of the roll of the multilayer film wound on the supply reel and exposed to outside. Another risk assumed therein is that because the supported layer located on the outer surface of the roll of the multilayer film wound after layer transfer on the take-up reel is exposed to outside, the supported layer left untransferred on the supporting layer would be liable to come off.

It would be desirable to restrain the supported layer including the transfer layer from being touched by an operator during an operation of attaching the supply reel to the holder, as well as to restrain the supported layer remaining on the supporting layer after layer transfer from coming off. Against the backdrop described above, a film cartridge installable into and removable from a layer transfer device for transferring a transfer layer onto a toner image formed on a sheet is disclosed. The film cartridge comprising: a supply reel including a supply shaft on which a multilayer film including a supported layer with the transfer layer included therein and a supporting layer supporting the supported layer is wound; and a take-up reel including a take-up shaft on which to take up the multilayer film. The multilayer film is wound on the supply shaft in such a manner that the supported layer is in contact with the supply shaft, and the multilayer film is wound on the take-up shaft in such a manner that the supported layer is in contact with the take-up shaft.

Also disclosed herein is a film unit comprising: a film cartridge as described above; a holder configured to support the supply reel and the take-up reel; a first guide shaft configured to contact the supporting layer of the multilayer film drawn out from the supply reel and change a traveling direction of the multilayer film; and a second guide shaft configured to contact the supporting layer of the multilayer film guided by the first guide shaft and change the traveling direction of the multilayer film.

With this configuration, since the multilayer film is wound on the supply shaft with the supported layer in contact with the supply shaft, an accidental contact of an operator with the multilayer film wound on the supply reel, if any, when the supply reel is attached to the holder, would only result in the operator's contact with the supporting layer and not result in the operator's contact with the supported layer, so that the supported layer can be protected. Similarly, since the multilayer film is would on the take-up shaft with the supported layer in contact with the take-up shaft, the supported layer left on the supporting layer in the multilayer film taken up on the take-up reel can be restrained from coming off, by the supporting layer.

A layer transfer device having a housing that allows the film unit to be installed therein and removed therefrom comprises: a heating member configured to heat the multilayer film; and a pressure member configured such that the multilayer film is nipped between the pressure member and the heating member. The housing comprises a housing main body having a third opening, and a cover configured to open and close the third opening. The pressure member is provided in the cover.

According to the film cartridge, the film unit, and the layer transfer device as described above, the transfer layer can be restrained from being touched by an operator during an operation of attaching the supply reel to the holder, and the transfer layer remaining on the supporting layer after layer transfer can be restrained from coming off.

BRIEF DESCRIPTION OF THE DRAWINGS

FIG. 3 includes: a section view (a) showing a relationship between a multilayer film and each shaft; and a section view (b) showing layers of the multilayer film in detail.

FIG. 9 includes: a section view (a) showing a state of a restraining frame moved to a release position; and a diagram (b) showing the restraining frame located in a restraining position as viewed from a second opening side.

DESCRIPTION OF EMBODIMENTS

A description will be given of one embodiment with reference made to the drawings where appropriate. In the following description, a general setup of a layer transfer device will be briefly described at the outset, and configurations of a film unit and a film cartridge will be described thereafter.

Figure 1:
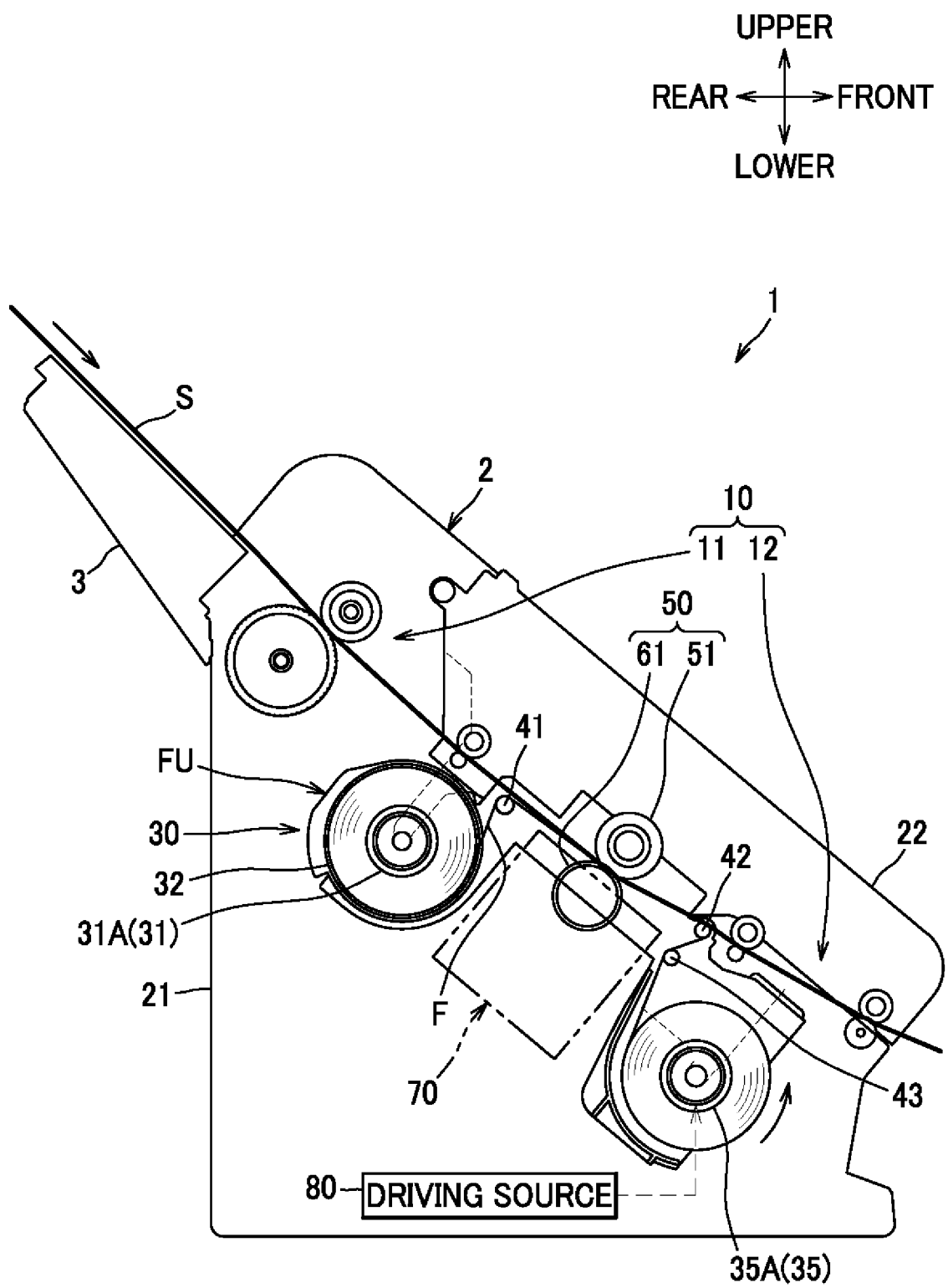
FIG. 1 is a diagram showing a layer transfer device in which a film unit is installed, according to one embodiment.

In the following description, directions will be referred to as directions shown in FIG. 1. That is, the right-hand side of FIG. 1 is referred to as "front", the left-hand side of FIG. 1 as "rear", the front side of the drawing sheet of FIG. 1 as "left", and the back side of the drawing sheet of FIG. 1 as "right". Similarly, upward/downward directions (upper/lower sides) of FIG. 1 are referred to as "upward/downward (upper/lower)".

As shown in FIG. 1, a layer transfer device 1 is a device for post-processing to be subjected to a sheet S on which a toner image is formed by an image forming apparatus, for example, a laser printer or the like; more specifically, a device for transferring foil such as of aluminum or the like onto the toner image on the sheet S. The layer transfer device 1 includes a housing 2, a sheet tray 3, a sheet conveyor unit 10, a film supply unit 30, and a transfer unit 50.

The housing 2 is made of plastic or the like, and includes a housing main body 21 and a cover 22. The housing main body 21 has a third opening 21A at its upper side (see FIG. 2). The third opening 21A is an opening through which to cause a film unit FU as will be described later to be installed into or removed from the housing main body 21. The cover 22 is a member for opening and closing the third opening 21A. A rear end portion of the cover 22 is rotatably supported by the housing main body 21.

The sheet tray 3 is a tray on which sheets S such as paper, OHP film, etc., are placed. The sheet tray 3 is provided at a rear portion of the housing 2. The sheets S, with surfaces thereof having toner images formed thereon facing downward, are placed on the sheet tray 3.

The sheet conveyor unit 10 includes a sheet feed mechanism 11 and a sheet ejection mechanism 12. The sheet feed mechanism 11 is a mechanism that conveys sheets S on the sheet tray 3 one by one toward the transfer unit 50. The sheet feed mechanism 11 includes a pickup roller and a conveyor roller.

The sheet ejection mechanism 12 is a mechanism that ejects a sheet S which has passed through the transfer unit 50, to the outside of the housing 2. The sheet ejection mechanism 12 includes a plurality of conveyor rollers.

The film supply unit 30 is a unit that supplies and lays a multilayer film F onto a sheet S conveyed from the sheet feed mechanism 11. The film supply unit 30 includes a film unit FU, and a driving source 80 such as a motor.

Figure 2:
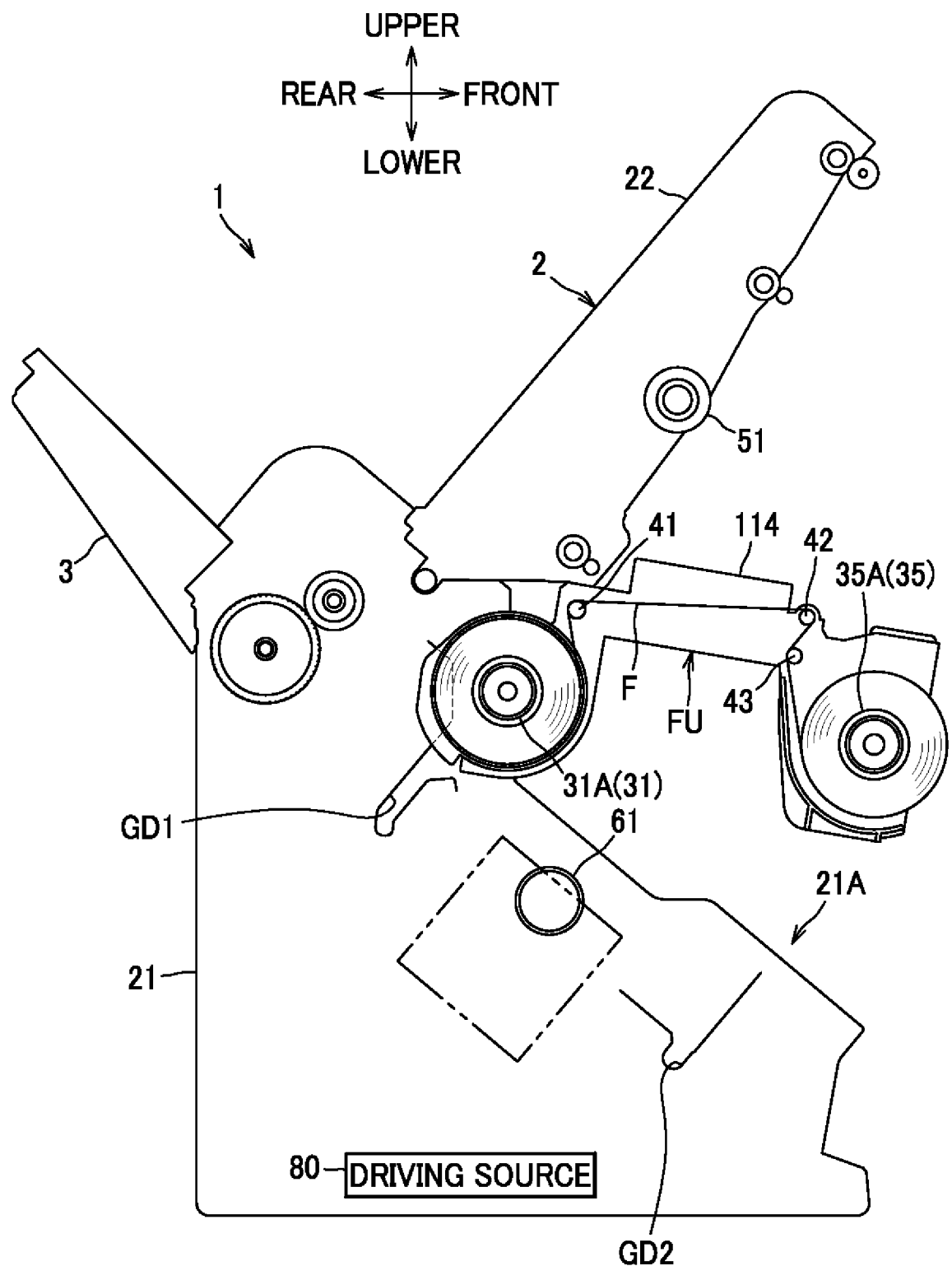
FIG. 2 is a diagram showing an open cover state of the layer transfer device.

The film unit FU is configured, as shown in FIG. 2, to be installable into and removable from the housing main body 21 along a direction perpendicular to an axial direction of a supply reel 31 which will be described later. The film unit FU includes a supply reel 31, a take-up reel 35, a first guide shaft 41, a second guide shaft 42, and a third guide shaft 43. A multilayer film F is wound on the supply reel 31 of the film unit FU.

As shown in FIG. 3(a), the multilayer film F includes a supporting layer F1 and a supported layer F2. The supporting layer F1 is a transparent substrate in the form of a tape and made of polymeric material, and supports the supported layer F2.

As shown in FIG. 3(b), the supported layer F2 includes a release layer F21, a transfer layer F22, and an adhesive layer F23. The release layer F21 is a layer for facilitating separation of the transfer layer F22 from the supporting layer F1, and is interposed between the supporting layer F1 and the transfer layer F22. The release layer F21 contains a transparent material, such as a wax-type resin, easily releasable from the supporting layer F1.

The transfer layer F22 is a layer to be transferred onto a toner image, and contains foil. Foil is a thin sheet of metal such as gold, silver, copper, aluminum, etc. The transfer layer F22 contains a colorant of gold-colored, silver-colored, red-colored, or other colored material, and a thermoplastic resin. The transfer layer F22 is interposed between the release layer F21 and the adhesive layer F23.

The adhesive layer F23 is a layer for facilitating adhesion of the transfer layer F22 to a toner image. The adhesive layer F23 contains a material, such as vinyl chloride resin, acrylic resin, etc., which tends to adhere to a toner image heated by the transfer unit 50 which will be described later.

The supply reel 31 is made of plastic or the like, and includes a supply shaft 31A on which a multilayer film F is wound. The multilayer film F is wound on the supply shaft 31A in such a manner that the supported layer F2 including the transfer layer F22 contacts the supply shaft 31A. That is, the multilayer film F is wound, with the supporting layer F1 facing outside and the supported layer F2 (transfer layer F22) facing inside, on the supply reel 31. Accordingly, in the outermost portion of a roll of the multilayer film F wound on the supply shaft 31A, the supporting layer F1 is positioned outside of the supported layer F2.

The take-up reel 35 is made of plastic or the like, and includes a take-up shaft 35A on which to take up the multilayer film F. The multilayer film F is to be wound on the take-up shaft 35A in such a manner that the supported layer F2 including the transfer layer F22 contacts the take-up shaft 35A. That is, the multilayer film F is to be wound, with the supporting layer F1 facing outside and the supported layer F2 (transfer layer F22) facing inside, on the take-up reel 35. Accordingly, in the outermost portion of a roll of the multilayer film F wound on the take-up shaft 35A, the supporting layer F1 is positioned outside of the supported layer F2.

It is to be understood that in FIG. 3 or other drawing figures, the supply reel 31 and the take-up reel 35 are illustrated as if the both reels were wound up to the maximum. In actuality, the film unit FU in new condition has its multilayer film F wound on the supply reel 31 in a roll of a maximum diameter, while no multilayer film F is wound on the take-up reel 35, or the multilayer film F is wound on the take-up reel 35 but in a roll of a minimum diameter. When the film unit FU is at the end of its life (i.e., the multilayer film F has been exhausted), the multilayer film F is wound on the take-up reel 35 in a roll of a maximum diameter, while no multilayer film F is wound on the supply reel 31, or the multilayer film F is wound on the supply reel 31 but in a roll of a minimum diameter.

The first guide shaft 41 is a shaft for changing a traveling direction of the multilayer film F drawn out from the supply reel 31. The first guide shaft 41 is made of plastic or the like. The first guide shaft 41 contacts the supporting layer F1 of the multilayer film F. The first guide shaft 41 is located in a region AR1 (region between broken lines in the drawing) defined by causing a supply case 32, which will be described later, to be projected in a perpendicular direction perpendicular to a plane FF containing the rotation axis X1 of the supply reel 31 and the rotation axis X2 of the take-up reel 35.

The second guide shaft 42 is a shaft for changing a traveling direction of the multilayer film F guided by the first guide shaft 41. The second guide shaft 42 is made of plastic or the like. The second guide shaft 42 contacts the supporting layer F1 of the multilayer film F. The second guide shaft 42 is located in a position farther, than the first guide shaft 41, from the supply reel 31 in the perpendicular direction perpendicular to the plane FF containing the rotation axes X1, X2.

The third guide shaft 43 is a shaft for changing a traveling direction of the multilayer film F guided by the second guide shaft 42 toward the take-up reel 35. The third guide shaft 43 is made of plastic or the like. The third guide shaft 43 is in contact with the supported layer F2 (adhesive layer F23) of the multilayer film F.

As shown in FIG. 1, the take-up reel 35 of the film unit FU installed in the layer transfer device 1 is caused to rotate counterclockwise as in the drawing by the driving source 80 provided in the housing 2. As the take-up reel 35 rotates, the multilayer film F wound on the supply reel 31 is drawn out, and the multilayer film F thus drawn out is taken up on the take-up reel 35. To be more specific, during the foil transfer process, the multilayer film F is forwarded by a pressure roller 51 and a heating roller 61 which will be described later whereby the multilayer film F is drawn out from the supply reel 31. The multilayer film F forwarded through the pressure roller 51 and the heating roller 61 are taken up on the take-up reel 35.

The first guide shaft 41 guides the multilayer film F drawn out from the supply reel 31 in such a manner that the supported layer F2 (see FIG. 3) thereof facing upward is laid under a sheet S being conveyed with a toner image facing downward. The first guide shaft 41 changes a direction of conveyance of the multilayer film F drawn out from the supply reel 31, and guides the multilayer film F in a direction substantially parallel to the direction of conveyance of the sheet S.

The second guide shaft 42 contacts the multilayer film F having passed through the transfer unit 50, and changes a direction of conveyance of the multilayer film F having passed through the transfer unit 50 into a direction different from a direction of conveyance of a sheet S. The multilayer film F having passed through the transfer unit 50 and conveyed with the sheet S laid thereon goes past the second guide shaft 42 and is thus guided in the direction different from the direction of conveyance of the sheet S, and peeled from the sheet S.

The transfer unit 50 is a unit that heats and pressurizes the sheet and the multilayer film F laid on each other, to transfer the transfer layer F22 onto a toner image formed on a sheet S. The transfer unit 50 includes a pressure roller 51 as an example of a pressure member, and a heating roller 61 as an example of a heating member. The transfer unit 50 applies heat and pressure to portions of a sheet S and a multilayer film F laid on each other and nipped between the pressure roller 51 and the heating roller 61.

The pressure roller 51 is a roller comprising a cylindrical metal core with its cylindrical surface coated with a rubber layer made of silicone rubber. The pressure roller 51 is located above the multilayer film F, and is contactable with a reverse side (opposite to a side on which a toner image is formed) of the sheet S.

The pressure roller 51 has two end portions supported rotatably by the cover 22. The pressure roller 51, which in combination with the heating roller 61, nips the sheet S and the multilayer film F, is driven to rotate by the driving source 80 and causes the heating roller 61 to rotate accordingly.

The heating roller 61 is a roller comprising a cylindrical metal tube with a heater located inside, to heat the multilayer film F and the sheet S. The heating roller 61 is located under the multilayer film F, and is in contact with the multilayer film F.

In this embodiment, the heating roller 61 is moved by a contact/separation mechanism 70 for bringing the heating roller 61 into and out of contact with the multilayer film F. When the cover 22 is closed, the contact/separation mechanism 70 causes the heating roller 61 to move to a contact position in which it contacts the multilayer film F, at each time when a sheet S is fed to the transfer unit 50. On the other hand, when the cover 22 is opened, or when foil transfer on a sheet S is not in process in the transfer unit 50, the contact/separation mechanism 70 causes the heating roller 61 to be positioned in a separate position in which it is separate from the multilayer film F.

With the layer transfer device 1 configured as described above, sheets S stacked on the sheet tray 3 with front surfaces facing downward are conveyed one by one toward the transfer unit 50 by the sheet feed mechanism 11. Each sheet S is laid on a multilayer film F supplied from the supply reel 31 at a position upstream of the transfer unit 50 in a sheet conveyance direction, and conveyed to the transfer unit 50 with a toner image of the sheet S being kept in contact with the multilayer film F.

In the transfer unit 50, the sheet S and the multilayer film F nipped and passing through between the pressure roller 51 and the heating roller 61 are heated and pressurized by the heating roller 61 and the pressure roller 51, so that foil is transferred onto the toner image, that is, the adhesive layer F23 of the multilayer film F is adhered to the toner image.

After foil is transferred, the sheet S and the multilayer film F adhered to each other are conveyed to the second guide shaft 42. When the sheet S and the multilayer film F travels past the second guide shaft 42, the direction of conveyance of the multilayer film F is changed into a direction different from the direction of conveyance of the sheet S; thereby the multilayer film F is peeled from the sheet S, that is, the supported layer F2 (including the adhesive layer F23 adhered to the toner image, the transfer layer F22 including foil, and the release layer F21) is peeled from the supporting layer F1 of the multilayer film F. It is to be understood that when the supported layer F2 is peeled from the supporting layer F1, part of the supported layer F2, specifically, part of the release layer F21, may remain on the supporting layer F1.

The multilayer film F peeled from the sheet S and including a supporting layer F1 peeled from the supported layer F2 now adhered to the toner image on the sheet S is taken up on the take-up reel 35. On the other hand, the sheet S from which the multilayer film F is peeled has a foil transferred surface facing downward and is ejected to the outside of the housing 2 by the sheet ejection mechanism 12.

Figure 4:
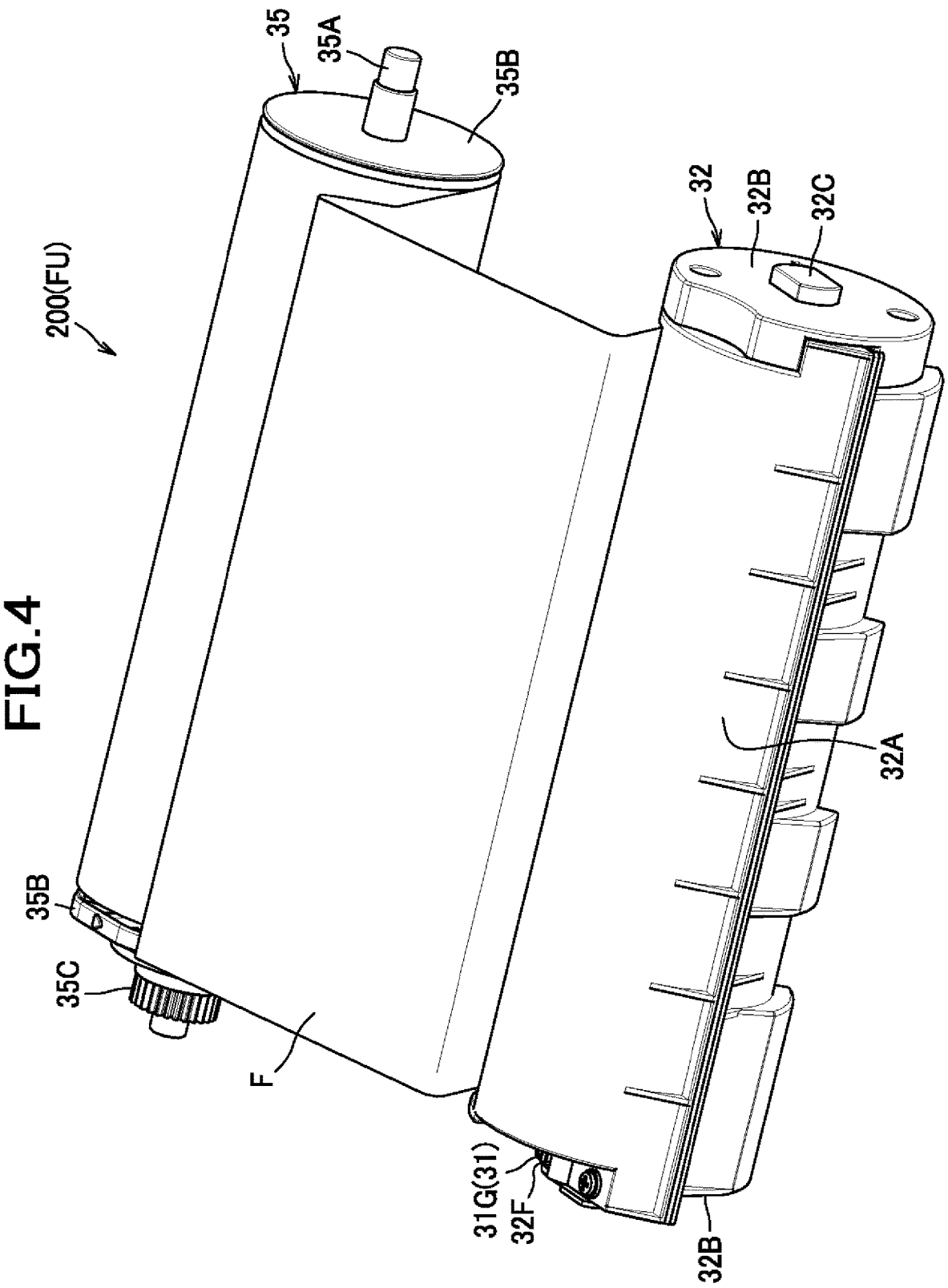
FIG. 4 is a perspective view showing a film cartridge.
Figure 5:
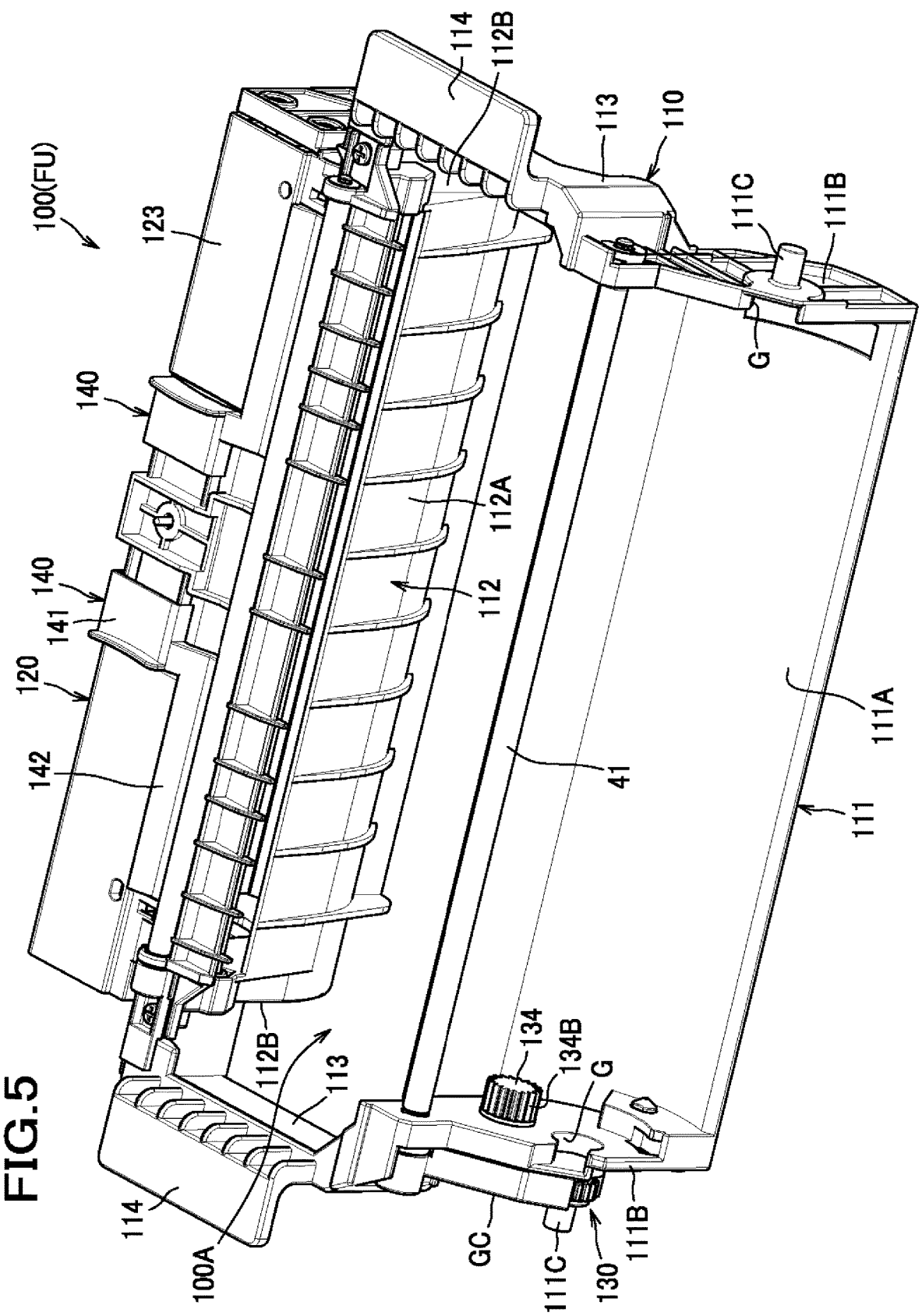
FIG. 5 is a perspective view showing a holder.

As shown in FIG. 4 and FIG. 5, the film unit FU includes a holder 100 made of plastic or the like, and a film cartridge 200 installable into and removable from the holder 100. The film cartridge 200 includes a supply reel 31 and a take-up reel 35 on which a multilayer film F as described above is wound, and a supply case 32. The supply reel 31 (more specifically, the supply case 32) and the take-up reel 35 are installable into and removable from the holder 100 in directions perpendicular to the axial direction of the supply reel 31.

As shown in FIG. 4 and FIG. 13(a), the supply case 32 is a hollow case accommodating the supply reel 31. The supply case 32 is made of plastic or the like, and includes an outer peripheral wall 32A, two side walls 32B, and an outer side wall 32J. The two side walls 32B are provided at ends apart from each other in the axial direction of the supply reel 31. The supply reel 31 is rotatably supported by the respective side walls 32B of the supply case 32. The outer side wall 32J is located apart in the axial direction from one side wall 32B of the two side walls 32B that is closer to the supply gear 31G. The outer side wall 32J is configured to cover at least part of the supply gear 31G from the axial direction. The outer peripheral wall 32A includes a portion having a substantially cylindrical shape which covers the multilayer film F wound on the supply shaft 31A of the supply reel 31. The outer peripheral wall 32A also includes a portion which covers the outer periphery of the supply gear 31G and connects the one side wall 32B and the outer side wall 32J. In this embodiment, the portion of the outer peripheral wall 32A which covers the supply reel 31 and the portion of the outer peripheral wall 32A which covers the supply gear 31G are joined to each other; however, these two portions of the outer peripheral wall 32A may be separated from each other by the one side wall 32B.

As shown in FIG. 4, each of the side walls 32B includes an engageable portion 32C having an elongate shape as viewed from a direction along the axis of the supply reel 31 (see also FIG. 13(a)). Each engageable portion 32C is a portion to be guided by an installation/removal guide G of the holder 100 which will be described later, and is formed in a shape of a rounded corner rectangle.

The supply reel 31 includes a supply gear 31G at an end of the supply shaft 31A facing outward in a direction along the axial direction of the supply reel 31 (see also FIG. 13(a)). At least part of the supply gear 31G is located between the one side wall 32B and the outer side wall 32J as viewed with a line of sight aligned with a direction perpendicular to the axial direction of the supply reel 31. The supply gear 31G is exposed to outside through a cutaway opening 32F formed in the portion of the outer peripheral wall 32A connecting the one side wall 32B and the outer side wall 32J. Accordingly, the supply gear 31G can be engaged with a gear provided outside. As at least part of the supply gear 31G is covered with the outer side wall 32J, interference of an exterior object with the supply gear 31G from the axial direction of the supply reel 31 which would otherwise occur when the film cartridge 200 is installed into the holder 100 or in other situations can be restrained.

Figure 6:
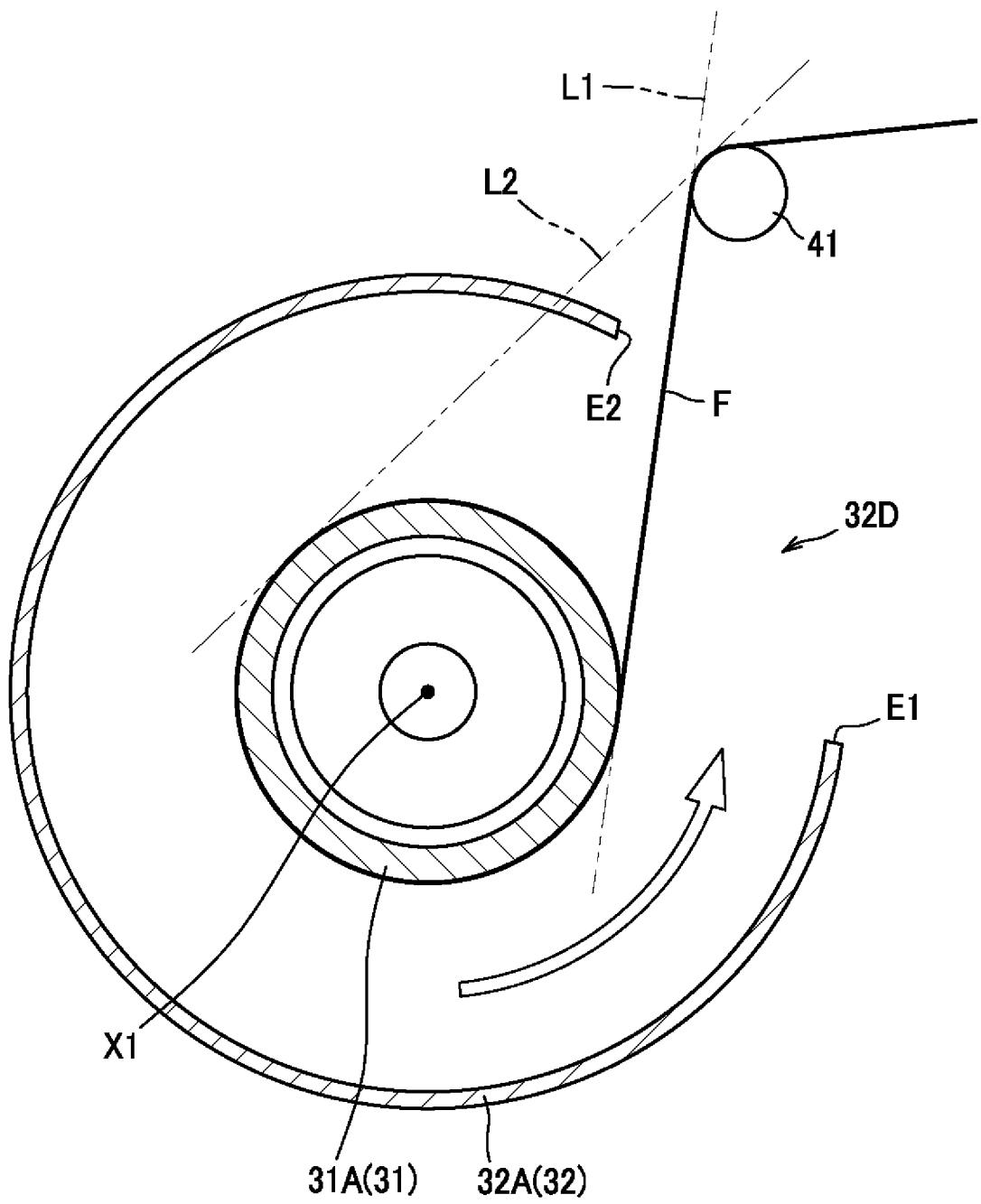
FIG. 6 is a section view showing a structure of a first opening and its vicinity of a supply case.

As shown in FIG. 6, the outer peripheral wall 32A has a first opening 32D. The first opening 32D is an opening for allowing the multilayer film F on the supply reel 31 to be drawn out therethrough. The first opening 32D has an upstream end E1 and a downstream end E2 located downstream from the upstream end E1 in the direction of rotation of the supply reel 31.

Figure 12:
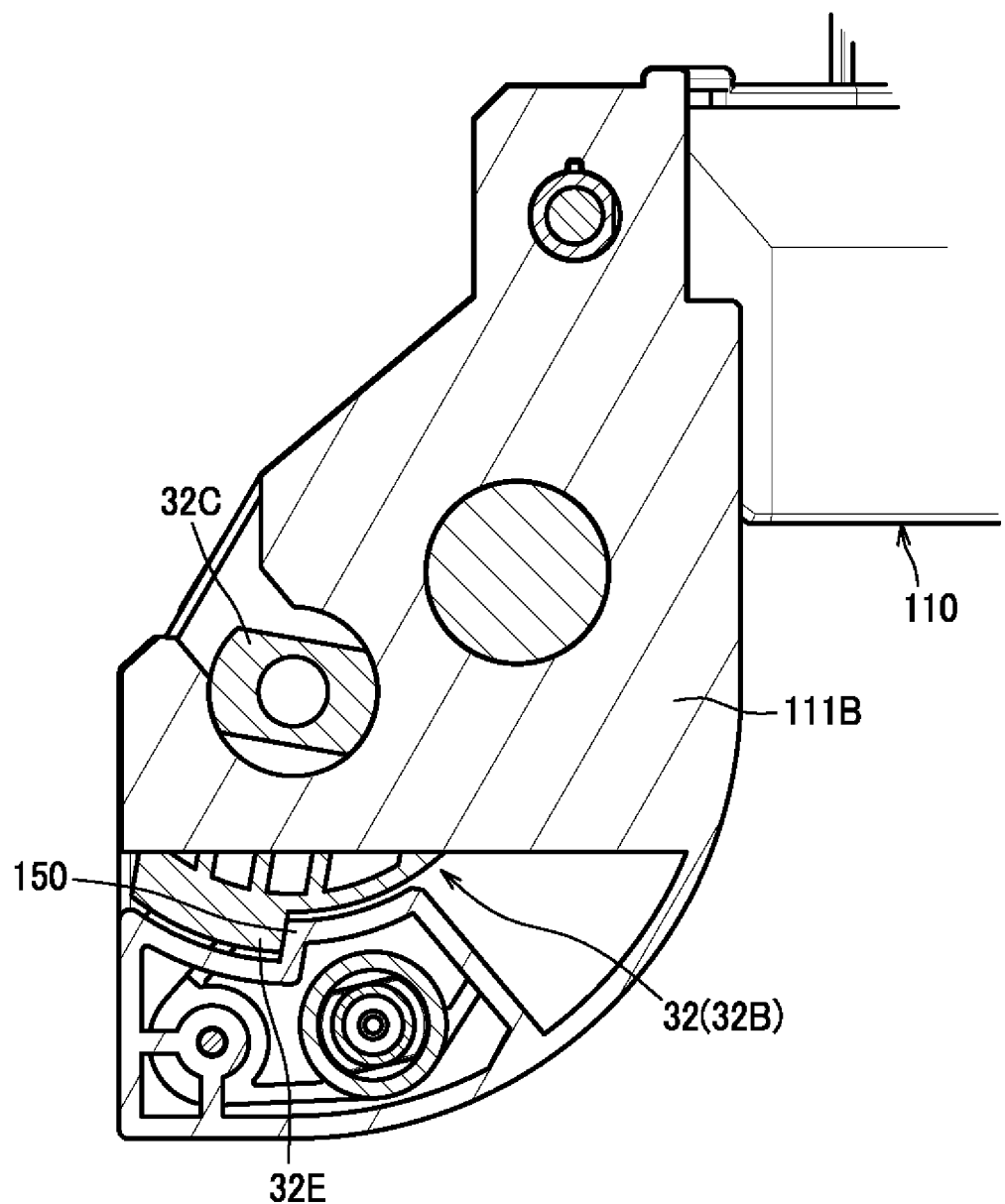
FIG. 12 is a section view taken along the line I-I of FIG. 11.

When the film cartridge 200 is installed in the holder 100, the downstream end E2 is located between the multilayer film F positioned along an internal common tangent L1 of the first guide shaft 41 and the supply shaft 31A and an external common tangent L2 of the first guide shaft 41 and the supply shaft 31A. Herein, the state when the film cartridge 200 is installed in the holder 100 is understood to indicate the state to be assumed when the rotation of the supply case 32 is restrained by a restraining portion 150 (see FIG. 12) which will be described later. The external common tangent L2 of the first guide shaft 41 and the supply shaft 31A is one located farther than the other from the take-up reel 35 of two external common tangents of which one is farther from and the other is closer to the take-up reel 35. The multilayer film F positioned along the internal common tangent L1 refers to the multilayer film F stretched between the first guide shaft 41 and the supply shaft 31A when the multilayer film F wound on the supply reel 31 has been drawn out to the last.

Returning to FIG. 4, the take-up reel 35 includes, in addition to the take-up shaft 35A described above, two flanges 35B, and a take-up gear 35C as an example of a driving power transmission member. End portions of the take-up shaft 35A pointing outward in directions along the axial direction of the take-up reel 35 are portions each guided by the second guide GD2 (see FIG. 2) formed in the housing main body 21, and protrude farther outward from the flanges 35B.

The flanges 35B are portions for restraining widthwise movement of the multilayer film F wound on the take-up shaft 35A. The flanges 35B are each formed in a shape of a disc having a diameter larger than that of the take-up shaft 35A, and provided at both end portions of the take-up shaft 35A.

The take-up gear 35C is a gear which receives a driving power from the driving source 80 provided in the layer transfer device 1 for transmitting the driving power to the take-up shaft 35A. The take-up gear 35C is located on an outside of the flange 35B facing in a direction along the axial direction. The take-up gear 35C is located coaxially with take-up shaft 35A.

As shown in FIG. 5, the holder 100 includes a base frame 110, and a restraining frame 120 rotatably (movably) supported by the base frame 110. The base frame 110 includes a first holding portion 111, a second holding portion 112, two connecting portions 113 and two handles 114.

The first holding portion 111 is a portion that holds the supply case 32. The first holding portion 111 holds the supply reel 31 via the supply case 32. The first holding portion 111 includes an outer peripheral wall 111A having a substantially arcuate shape in cross section, and two side walls 111B.

The outer peripheral wall 111A is located along the outer peripheral surface of the supply case 32. The side wall 111B is located at each end of the outer peripheral wall 111A facing outward in the axial direction of the supply reel 31.

The side walls 111B are arranged outside in directions along the axial direction of the first guide shaft 41 with the first guide shaft 41 held therebetween, and support the first guide shaft 41 in a manner that permits the first guide shaft 41 to rotate. Each of the side walls 111B has an installation/removal guide G for guiding the supply case 32 along a predetermined direction when the supply case 32 is installed and removed. The installation/removal guide G is formed in an inner surface facing inward in a direction along the axial direction (inner surface facing the supply case 32 in a direction along the axial direction) of each side wall 111B.

Figure 7:
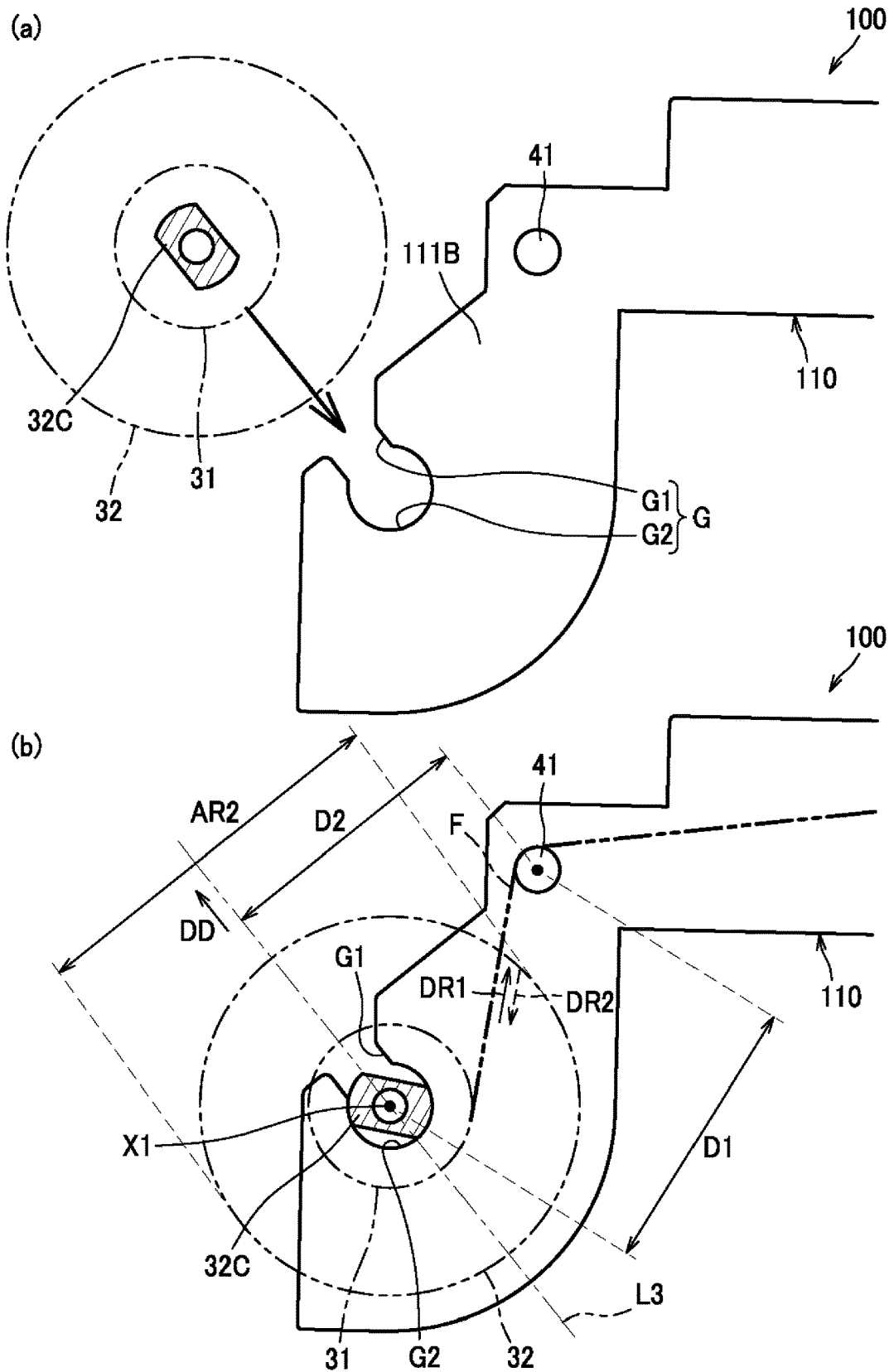
FIG. 7 includes section views (a), (b) showing a relationship between an engageable portion and an installation/removal guide.

As shown in FIG. 7(a), (b), the installation/removal guide G includes a guide groove G1 and a holding hole G2. The guide groove G1 is a groove that guides the engageable portion 32C along the predetermined direction (the direction indicated by an arrow in the drawing). The width (the dimension perpendicular to the predetermined direction) of the guide groove G1 is smaller than the longer side of the engageable portion 32C and greater than the shorter side of the engageable portion 32C.

The predetermined direction along which the engageable portion 32C is guided by the guide groove G1 is defined as follows. As shown in FIG. 7(b), the predetermined direction is set such that a direction DD of movement of the supply case 32 guided by the guide groove G1 when the supply case 32 is removed from the holder 100, that is, a direction of removal, is a direction of a vector which does not contain a component of a vector a direction DR2 of which is opposite to a direction DR1 in which the multilayer film F is drawn out from the supply reel 31. The predetermined direction is set to be a direction perpendicular to the axial direction of the supply reel 31. The "direction DR1 in which the multilayer film F is drawn out from the supply reel 31" which may vary according to a roll diameter of the multilayer film F wound on the supply reel 31 is to be understood to refer to a direction assumed when the multilayer film F wound on the supply reel 31 has been drawn out to the last.

In this embodiment, the guide groove G1 is configured to guide the engageable portion 32C of the supply case 32 such that when the supply case 32 is removed from the holder 100 along the predetermined direction, an inter-axial distance between the supply reel 31 and the first guide shaft 41 decreases gradually. To be more specific, the predetermined direction is set such that when the supply reel 31 is installed in the holder 100, a distance D2 between a straight line L3 passing through the rotation axis X1 of the supply reel 31 and extending along the predetermined direction, and a center of the first guide shaft 41 is smaller than an inter-axial distance D1 between the supply reel 31 and the first guide shaft 41.

The first guide shaft 41 is located out of a region AR2 (region between broken lines in the drawing) defined by causing the supply case 32 installed in the holder 100 to be projected in the predetermined direction.

The holding hole G2 is a circular hole configured to hold the engageable portion 32C in a manner that permits the engageable portion 32C to rotate, and is connected to the guide groove G1. The center of the holding hole G2 coincides with the rotation axis X1. The holding hole G2 has a diameter greater than the longer side of the engageable portion 32C. When the engageable portion 32C is inserted in the guide groove G1 and put into the holding hole G2, and the supply case 32 is thereafter caused to rotate about the rotation axis X1 counterclockwise as in the drawing, the supply case 32 is brought into contact with the restraining portion 150 shown in FIG. 12 and located in place, with the result that the supply case 32 is installed in the holder 100.

The restraining portion 150 is a portion that restrains rotation of the supply case 32 with the engageable portion 32C held in the holding hole G2. The restraining portion 150 is provided in one of the side walls 111B of the holder 100. The supply case 32 includes a contact portion 32E contactable with the restraining portion 150. The contact portion 32E is provided in one of the side walls 32B (the side wall 32 on which the supply gear 31G is located) of the supply case 32.

The restraining portion 150 and the contact portion 32E are arranged such that a longitudinal direction of the engageable portion 32C of the supply case 32 of which rotation is restrained by the restraining portion 150 is nonparallel to the predetermined direction. In other words, the longitudinal direction of the engageable portion 32C of the supply case 32 of which rotation is restrained by the restraining portion 150 intersects with the straight line L3 oriented along the predetermined direction parallel to the direction DD of movement shown in FIG. 7(b).

Figure 13:
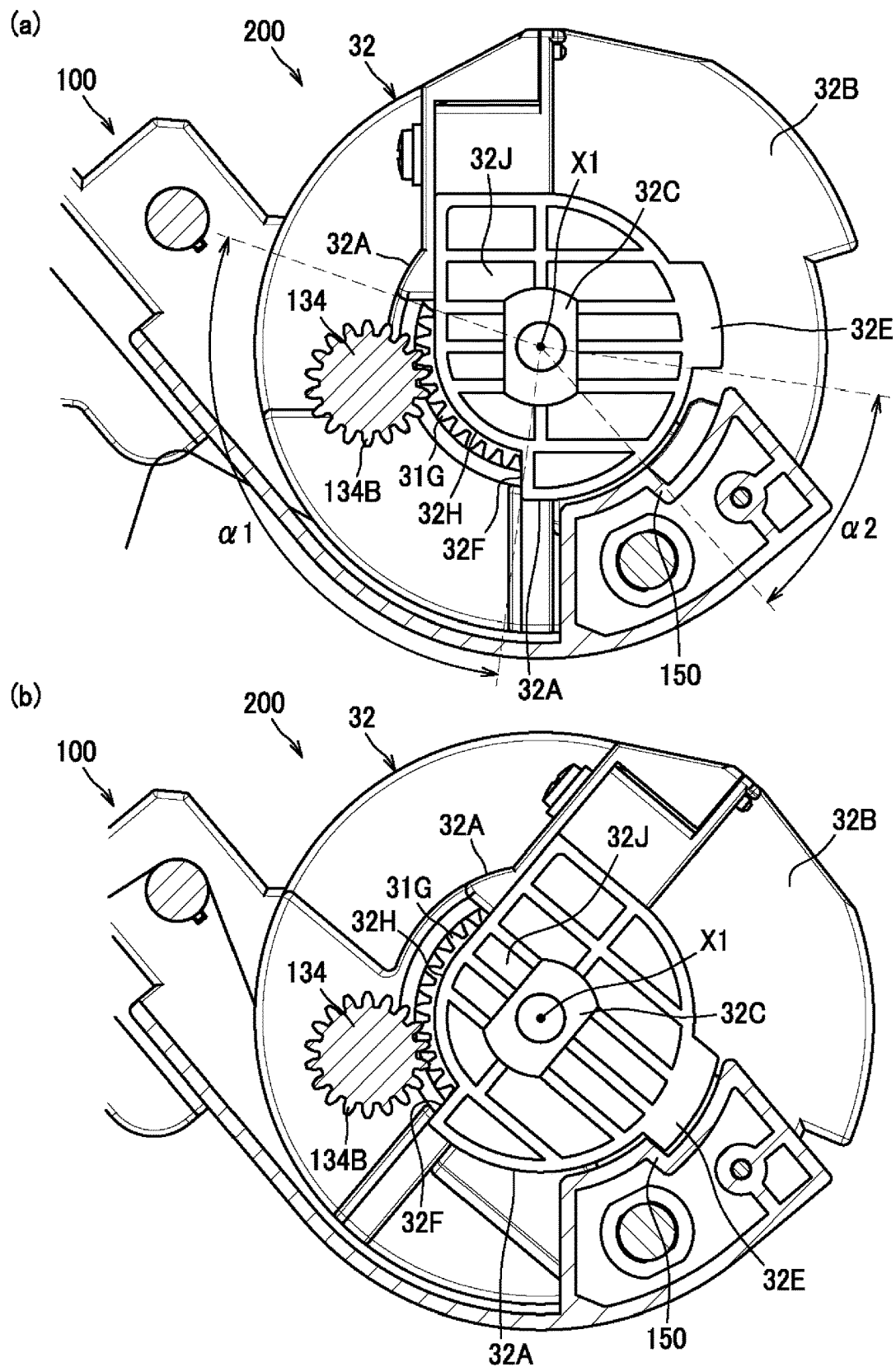
FIG. 13 explains an opening of the supply case, including a diagram (a) showing a state in which the engageable portion is in a holding hole; and a diagram (b) showing a state of completion of installing operation by rotation of the supply case commenced from the state shown in the diagram (a).

As shown in FIG. 13, an angle $\alpha 1$ of the angular range of the opening 32F as measured around the rotation axis of the supply case 32 is smaller than 180 degrees. This angle $\alpha 1$ is shown in FIG. 13 as an angle formed by two straight lines connecting the rotation axis X1 and edges adjacent to the opening 32F of the outer peripheral wall 32A. With this feature, a deficiency of rigidity as would be involved if the opening 32F were larger, large to excess, can be restrained. The angle $\alpha 1$ of the angular range of the opening 32F is greater than an angle $\alpha 2$ of rotation which the supply case 32 makes when installed in the holder 100. The angle $\alpha 2$ is an angle of rotation made after the engageable portion 32C is inserted through the guide groove G1 in the holding hole G2 till the contact portion 32E comes in contact with the restraining portion 150. With this feature, the interference of the outer peripheral wall 32A of the supply case 32 with a second gear 134 (see FIG. 5) with which the supply gear 31G is engageable can be restrained.

The outer side wall 32J does not cover tops of gear teeth in a range of the angle $\alpha 1$ over which the opening 32F is formed, as viewed with a line of sight aligned with a direction of the rotation axis X1. The outer side wall 32J does not cover bottoms of gear tooth spaces in the range of the angle $\alpha 1$ over which the opening 32F is formed, as viewed with a line of sight aligned with a direction of the rotation axis X1. In other words, the distance between the edge 32H of the outer side wall 32J in the range of the angle $\alpha 1$ over which the opening 32F is formed and the rotation axis X1 is smaller than a radius of the addendum circle of the gear teeth and smaller than a radius of the dedendum circle of the supply gear 31G. Accordingly, interference of the second gear 134 with the outer side wall 32J of the supply case 32 which would otherwise take place when the supply case 32 is installed into the holder 100 can be restrained.

Referring back to FIG. 5, a gearing system 130 is provided at one of the two side walls 111B. The gearing system 130 is a mechanism for imposing on the supply reel 31 a load of a torque limiter (not shown) provided in the housing main body 21. The structure of the gearing system 130 will be described later.

Each side wall 111B includes a boss 111C having a shape of a circular cylinder. To be more specific, the side wall 111B on which the gearing system 130 is provided includes a boss 111C via a gear cover GC. The gear cover GC is a cover with which the gearing system 130 is covered, and includes the boss 111C. The gear cover GC is fixed on a surface of the side wall 111B facing outward in a direction along the axial direction.

Each boss 111C is a portion to be guided by the first guide GD1 (see FIG. 2) formed in the housing main body 21 when the film unit FU is installed into and removed from the housing main body 21. One of the bosses 111C protrudes from a surface of the side wall 111B facing outward in a direction along the axial direction. The other of the bosses 111C protrudes from a surface of the gear cover GC facing outward in another direction along the axial direction.

The second holding portion 112 is a portion that holds the take-up reel 35. To be more specific, the second holding portion 112 is combined with the restraining frame 120 to make up a hollow case, and the take-up reel 35 is accommodated in the hollow case.

The second holding portion 112 includes a covering portion 112A and two side walls 112B. The covering portion 112A is a portion that covers the multilayer film F wound on the take-up reel 35. The side wall 112B is located at each end of the covering portion 112A facing outward in the axial direction of the take-up reel 35.

The two connecting portions 113 are portions that connect the first holding portion 111 and the second holding portion 112. To be more specific, the connecting portions 113 are arranged apart from each other in the axial direction of the supply reel 31. One of the connecting portions 113 apart from each other in the axial direction connects one of the side walls 111B of the first holding portion 111 and one of the side walls 112B of the second holding portion 112. The other of the connecting portions 113 apart from each other in the axial direction connects the other of the side walls 111B of the first holding portion 111 and the other of the side walls 112B of the second holding portion 112.

With the connecting portions 113 being formed in this way, the holder 100 is provided with a through hole 100A extending in the aforementioned perpendicular direction. The handle 114 is provided on each of the connecting portions 113. The handles 114 are located at opposite ends of the holder 100 apart from each other in the axial direction of the take-up reel 35.

Figure 8:
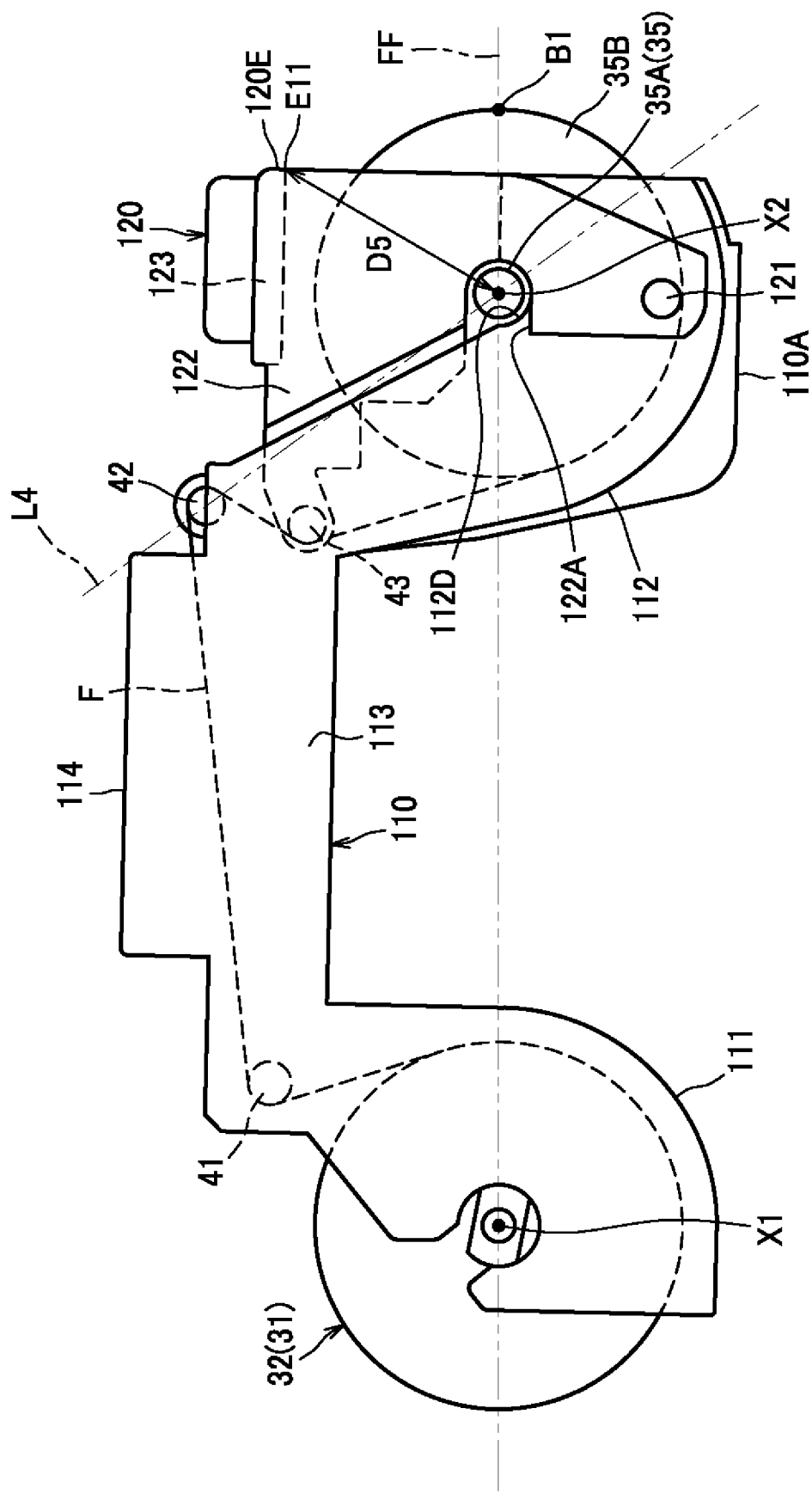
FIG. 8 is a side view of the film unit as viewed from a direction along an axial direction.

As shown in FIG. 8, the connecting portions 113 are located off a plane FF containing the rotation axis X1 of the supply reel 31 and the rotation axis X2 of the take-up reel 35 to one side (on the upper side of the plane FF in the drawing). Each of the handles 114 protrudes in a position shifted from the multilayer film F laid on the first guide shaft 41 and the second guide shaft 42, in a direction away from the first guide shaft 41 and the second guide shaft 42 (the position on the upper side of the film F in the drawing).

The outer surface of the base frame 110 has a first surface 110A located in a position shifted in the perpendicular direction perpendicular to the plane FF containing the rotation axis X1 of the supply reel 31 and the rotation axis X2 of the take-up reel 35, on one side relative to the third guide shaft 43 which is the same side as that on which the rotation axis X2 of the take-up reel 35 is located. The first surface 110A is located in the position distanced farther than the rotation axis X2 of the take-up reel 35 from the third guide shaft 43.

The restraining frame 120 is configured to be rotatable between a restraining position shown in FIG. 8 and a release position shown in FIG. 9(a). When the restraining frame 120 is in the restraining position, restraint is placed on movement of the take-up reel 35 in installation/removal directions thereof. When the restraining frame 120 is in the release position, the restraint on the movement of the take-up reel 35 is lifted.

The restraining frame 120 includes the third guide shaft 43. When the restraining frame 120 is in the restraining position, the third guide shaft 43 is positioned in a first position; when the restraining frame 120 is in the release position, the third guide shaft 43 is positioned in a second position.

The third guide shaft 43 in the first position is positioned closer to the supply reel 31 than, that is on a supply reel side with respect to, a straight line L4 connecting a center of the take-up shaft 35A (rotation axis X2 of the take-up reel 35) and a center of the second guide shaft 42. The third guide shaft 43 in the second position is positioned on a side opposite to the supply reel side (the side on which the supply reel 31 is positioned) with respect to the straight line L4. The third guide shaft 43 in the second position is far apart from the second guide shaft 42 at a distance greater than a maximum roll diameter of the multilayer film F wound on the take-up reel 35. In other words, the axial distance between the second guide shaft 42 and the third guide shaft 43 in the second position is greater than the maximum roll diameter of the multilayer film F wound on the take-up reel 35.

The restraining frame 120 in the restraining position has one end 120E that is located farthest from the supply reel 31. To be more specific, the one end 120E is in a position distanced farthest from the supply reel 31 along a direction parallel to the straight line connecting the rotation axis X1 of the supply reel 31 and the rotation axis X2 of the take-up reel 35. As shown in FIG. 9(b), the one end 120E has a second opening 120A through which the multilayer film F wound on the take-up reel 35 is exposed to outside when the restraining frame 120 is in the restraining position.

The second opening 120A has a dimension D3 in the axial direction which is wider than the width D4 of the multilayer film F. As shown in FIG. 8, the second opening 120A has edges among which an edge E11 oppositely laid across an outer surface of the multilayer film F is positioned such that a distance D5 therefrom to the rotation axis X2 of the take-up reel 35 is greater than a maximum roll radius of the multilayer film F wound on the take-up reel 35.

The restraining frame 120 is configured to be rotatable relative to the base frame 110 about the rotation axis 121. The rotation axis 121 is in a position distanced farther than the rotation axis X2 of the take-up reel 35 from the third guide shaft 43 in the perpendicular direction perpendicular to the plane FF mentioned above.

To be more specific, as shown in FIG. 9(b), the restraining frame 120 includes two side walls 122, and a connecting wall 123 connecting the side walls 122. As shown in FIG. 8, each side wall 122 is rotatably supported by the base frame 110. Each side wall 122 supports the third guide shaft 43 in a manner that permits the third guide shaft 43 to rotate. Moreover, each side wall 122 has a recess 122A formed therein to receive the take-up shaft 35A of the take-up reel 35.

The recess 122A is combined with a recess 112D formed in the second holding portion 112 to form a hole holding the take-up shaft 35A. This hole is a hole engageable loosely with the take-up shaft 35A. The take-up shaft 35A is movable inside the hole in directions perpendicular to the axial direction.

The take-up reel 35 comprises a farthest portion B1 that is located farthest from the supply reel 31. In this embodiment, it is the flange 35B of the take-up reel 35 that comprises the farthest portion B1. The farthest portion B1 is distanced farthest from the supply reel 31 in a direction along the straight line connecting the rotation axis X1 of the supply reel 31 and the rotation axis X2 of the take-up reel 35.

The one end 120E of the restraining frame 120 in the restraining position is closer than the farthest portion B1 to the supply reel 31. To be more specific, the one end 120E is closer than the farthest portion B1 to the supply reel 31 in the direction along the straight line connecting the rotation axis X1 of the supply reel 31 and the rotation axis X2 of the take-up reel 35.

As shown in FIG. 5, two lock members 140 are provided on the restraining frame 120. The lock members 140 are supported, movably along the axial direction, by the connecting wall 123 of the restraining frame 120. The lock members 140 are biased in directions away from each other by a spring (not shown).

Each lock member 140 includes an operation part 141 and an extension part 142. The operation part 141 is a part to be operated by a user. The operation parts 141 are located in the middle of a range, along the axial direction, of the connecting wall 123 of the restraining frame 120.

Figure 10:
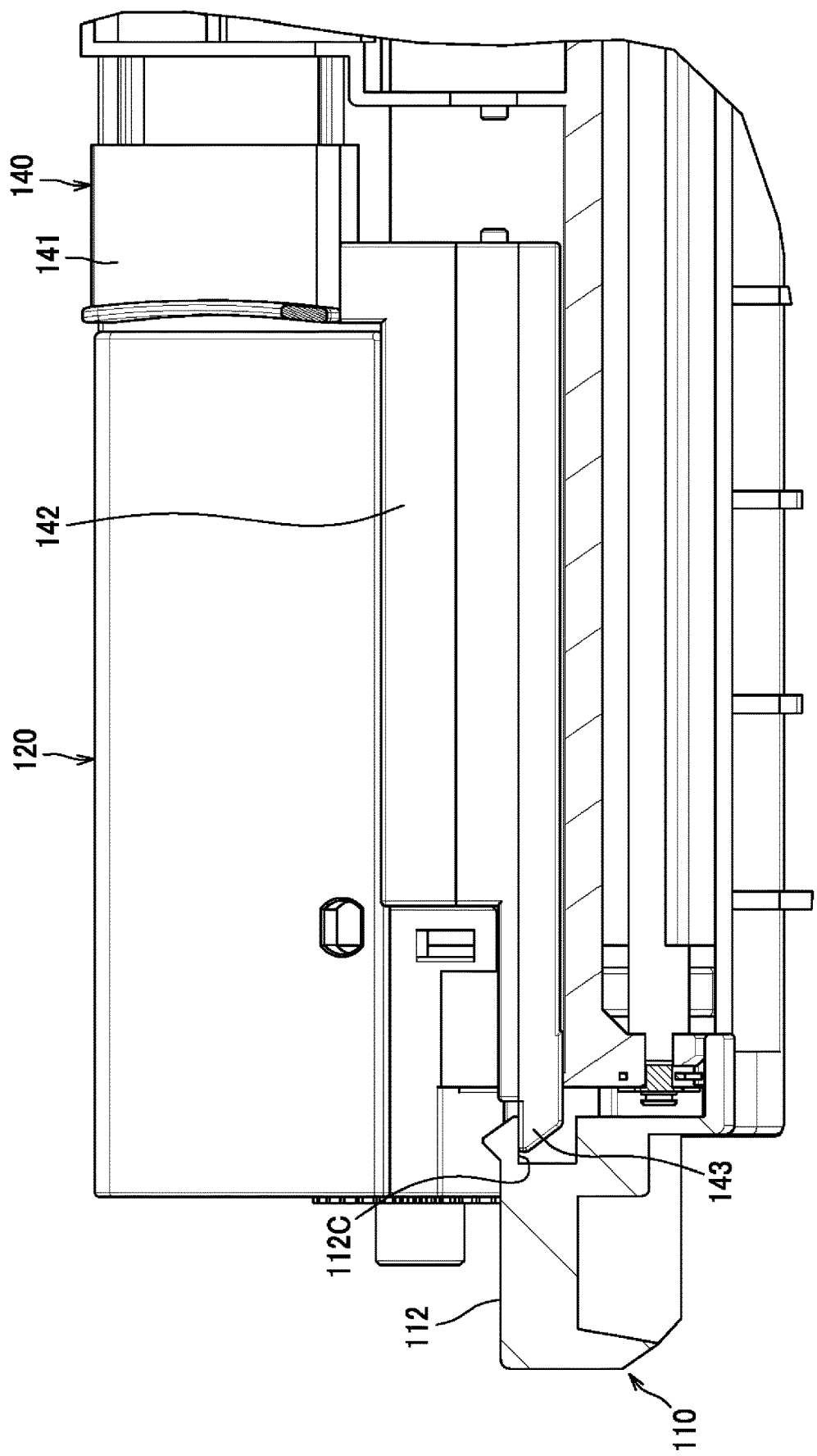
FIG. 10 is a section view showing a relationship between a lock member and a base frame.

The extension part 142 extends from the operation part 141 outward along the axial direction. As shown in FIG. 10, the extension part 142 has an extreme end 143 engaged with a recess 112C formed in the second holding portion 112 of the base frame 110. Such engagement of the extreme end 143 with the recess 112C serves to restrain the restraining frame 120 from moving from the restraining position to the release position.

The extreme end 143 is biased toward the recess 112C by the spring (not shown) and thereby engaged in the recess 112C unless the operation part 141 is operated. The extreme end 143 is configured to get disengaged from the recess 112 when the operation part 141 is moved against the biasing force of the spring.

As shown in FIG. 8, when the restraining frame 120 is in the restraining position, the third guide shaft 43 receives a biasing force from the multilayer film F. To be more specific, when the restraining frame 120 is in the restraining position and the take-up reel 35 is driven, a tension is produced on the multilayer film F between the second guide shaft 42 and the take-up shaft 35A, and causes the multilayer film F to tend to orient into a straight position between the second guide shaft 42 and the take-up shaft 35A.

Accordingly, the third guide shaft 43, and by extension the restraining frame 120, receives the biasing force from the multilayer film F, and is biased toward a direction from the restraining position to the release position.

Therefore, as shown in FIG. 10, the extreme end 143 of the lock member 140 as well is biased by a biasing force applied on the third guide shaft 43 from the multilayer film F, toward a side surface of the recess 112C of the base frame 110. In other words, the extreme end 143 of the lock member 140 receives the biasing force from the multilayer film F, and is biased from the restraining position to the release position, and brought into contact with the side surface of the recess 112C.

Figure 11:
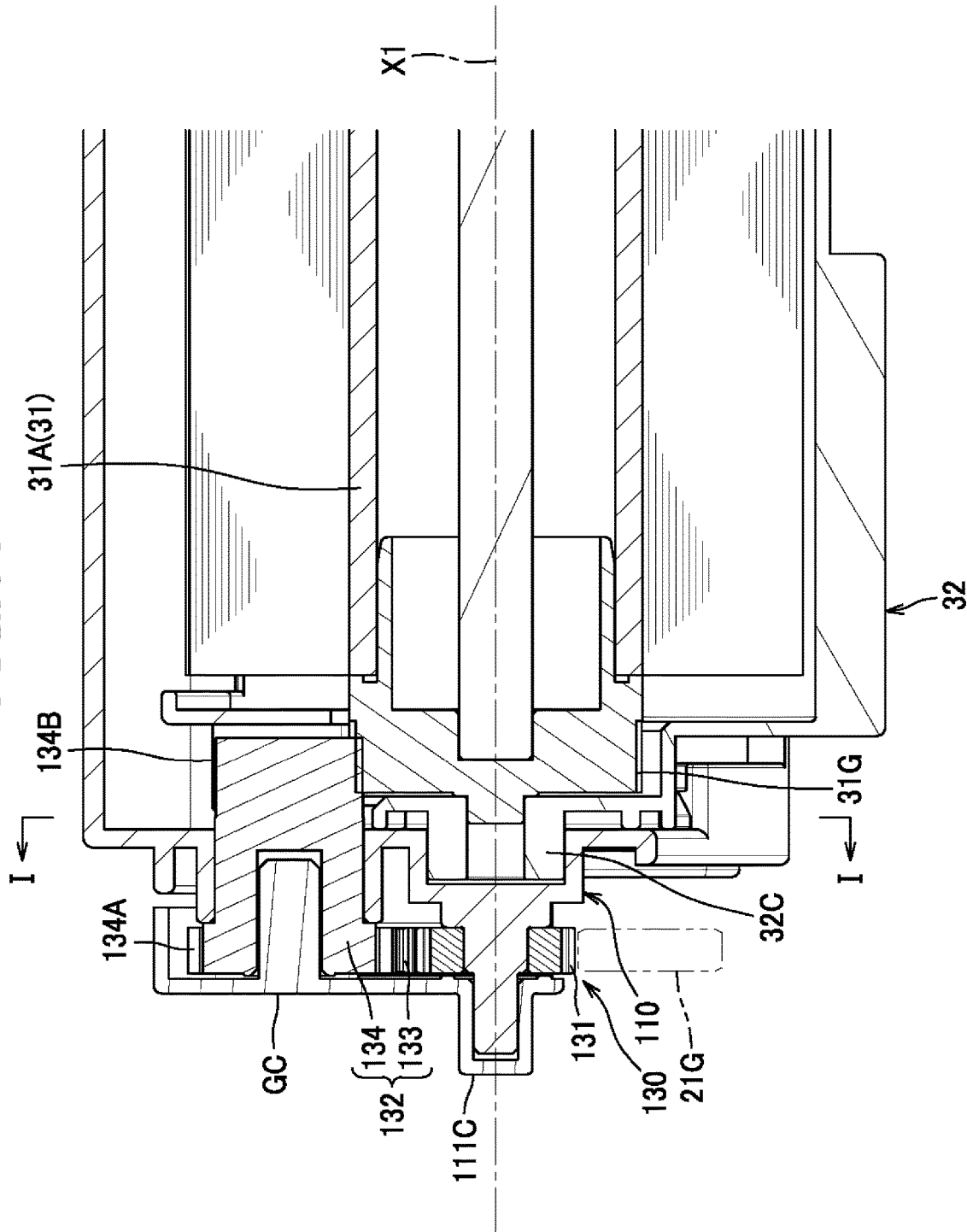
FIG. 11 is a section view showing a supply gear side structure of a supply reel.

As shown in FIG. 11, the gearing system 130 for imposing a load on the supply reel 31 includes a frame gear 131 and a gear train 132. The frame gear 131 is a gear that engages with a housing gear 21G provided in the housing main body 21. The frame gear 131 is connected to the torque limiter or the like via the housing gear 21G.

The gear train 132 is a gear train that connects the frame gear 131 and the supply gear 31G in such a manner that a direction of rotation of the supply gear 31G is opposite to a direction of rotation of the frame gear 131. Such opposite directions of rotation of the supply gear 31G and the frame gear 131 serve to restrain the supply reel 31 from moving in a disengaging direction off the first guide GD1 (see FIG. 2), when the multilayer film F is drawn out from the supply reel 31.

The gear train 132 includes a first gear 133 and a second gear 134. The first gear 133 engages with the frame gear 131. The second gear 134 is a two-stage gear cluster and includes a large-diameter gear 134A and a small-diameter gear 134B.

The large-diameter gear 134A is a gear having a diameter larger than a diameter of the small-diameter gear 134B. The large-diameter gear 134A engages with the first gear 133. The small-diameter gear 134B engages with the supply gear 31G.

The frame gear 131 is arranged coaxially with the supply gear 31G. The boss 111C and the engageable portion 32C as described above are positioned on the rotation axis X1 of the supply reel 31.

Next, an operation of changing a film unit FU is explained.

As shown in FIG. 1, when the multilayer film F in the film unit FU has been used up for foil transfer and completely exhausted, a user raises the cover 22 of the housing 2 up to open the third opening 21A of the housing main body 21. Then, the user causes the film unit FU to be guided by the guides GD1, GD2 of the housing main body 21 and removed from the housing main body 21.

In this operation, the user can grasp the two handles 114 shown in FIG. 5 to remove the film unit FU; therefore operation for removing of the film unit FU can be performed easily. Subsequently, the user rotates the supply case 32 approximately 45 degrees relative to the holder 100 of the film unit FU, as shown in FIG. 7(b), to align the orientation of the engageable portion 32C with the guide groove G1. Next, the user causes the engageable portion 32C to be guided by the guide groove G1, to remove the supply case 32 in a direction along the direction DD of movement.

In this operation, the supply case 32 passes through the region AR2 between broken lines in the drawing; therefore, interference of the supply case 32 with the first guide shaft 41 can be restrained. Moreover, the direction DD of movement is a direction of a vector which does not contain a component of a vector the direction DR2 of which is opposite to a direction DR1 in which the multilayer film F is drawn out from the supply reel 31; therefore, when the supply case 32 is removed from the holder 100, the tension applied to the portion of the multilayer film F between the first guide shaft 41 and the supply reel 31 gradually becomes lower. Accordingly, the user can remove the supply case 32 from the holder 100 easily.

Thereafter, as shown in FIG. 8 and FIG. 9(a), the user rotates the restraining frame 120 from the restraining position to the release position. Herein, the one end 120E of the restraining frame 120 in the restraining position is located closer than the farthest position B1 of the take-up reel 35 to the supply reel 31; therefore, even when the first surface 110A of the base frame 110 is placed on a surface of a table or other installation surface, the restraining frame 120 can be rotated largely, and the operation of removing the take-up reel 35 can be performed easily.

When the restraining frame 120 is moved to the release position, the third guide shaft 43 is moved together with the restraining frame 120 to the second position; therefore, the take-up reel 35 can be removed easily. In particular, when the third guide shaft 43 is in the second position, the inter-axial distance between the second guide shaft 42 and the third guide shaft 43 is greater than the maximum roll diameter of the multilayer film F wound on the take-up reel 35; therefore, the take-up reel 35 can be removed easily through between the second guide shaft 42 and the third guide shaft 43. The operation of installing a new film cartridge 200 into the holder 100, and the operation of installing the film unit FU into the housing main body 21 may be performed by following the above-described steps of operation in reverse; therefore, a description thereof is omitted herein.

According to the present embodiment described above, the following advantageous effects, in addition to the advantageous effects described above, can be achieved.

Since the multilayer film F is wound on the supply shaft 31A in such a manner that the supported layer F2 contacts the supply shaft 31A, the multilayer film F is wound, with the supporting layer F1 facing outside and the supported layer F2 facing inside, on the supply reel 31, so that unintentional touching of a user on the supported layer F2 can be restrained. In this embodiment, the multilayer film F wound on the supply reel 31 is covered with the supply case 32, and thus such unintentional touching of a user on the supported layer F2 located on the supply reel 31 side does not occur; even in an alternative embodiment without the supply case 32, unintentional touching of a user on the supported layer F2 can be restrained because the supported layer F2 is protected by the supporting layer F1.

Since the multilayer film F is wound on the take-up shaft 35A in such a manner that the supported layer F2 contacts the take-up shaft 35A, the supporting layer F1 of the multilayer film F wound on the take-up reel 35 is positioned outside the supported layer F2 of the multilayer film F, so that the supported layer F2 left on the supporting layer F1 can be restrained from coming off, by the supporting layer F1.

Since the film cartridge 200 is configured to be installable into and removable from the holder 100, the holder 100 is rendered reusable, and thus environmentally friendly in comparison, for example, with a film unit without the feature of a film cartridge installable into and removable from a holder.

Since the first guide shaft 41 is located in the region AR defined by causing the supply case 32 to be projected in a perpendicular direction perpendicular to a plane FF containing the rotation axes X1, X2 (see FIG. 3), the supply case 32 can be located closer to the take-up reel 35 in the direction of a straight line connecting the rotation axes X1, X2, so that the upsizing of the film unit FU can be restrained.

Since the installation/removal guide G comprises the guide groove G1 and the circular holding hole G2, the engageable portion 32C may be inserted into the guide groove G1, and when the engageable portion 32C reaches the holding hole G2, the supply case 32 may be rotated so that the engageable portion 32C is made unremovable from the guide groove G1 in the predetermined direction. Therefore, the supply case 32 can be installed into and removed from the installation/removal guide G with simple operations.

Since the rotation of the supply case 32 is restrained by the restraining portion 150, the longitudinal direction of the engageable portion 32C can be made nonparallel to the predetermined direction, so that the engageable portion 32C can be restrained from getting disengaged from the installation/removal guide G.

In the above-described embodiment, the downstream end E2 of the first opening 32D is located between the multilayer film F positioned along the internal common tangent L1 of the first guide shaft 41 and the supply shaft 31A and the external common tangent L2 of the first guide shaft 41 and the supply shaft 31A which external common tangent is one located farther than the other from the take-up reel 35. Accordingly, the downstream end E2 can be located in such a position as not to interfere with, and as close as possible to, the last section of the multilayer film F just short of exhaustion; therefore, the size of the first opening 32D can be reduced, and the rigidity of the supply case 32 can be enhanced.

When the third guide shaft 43 is in the first position, the multilayer film F bent at the second guide shaft 42 can be angled acutely; therefore, when the multilayer film F laminated on a sheet S in the foil transfer process is separated from the sheet S after the foil transfer process, the transfer layer F22 can be peeled neatly from the sheet S.

Since a space is formed between the first holding portion 111 and the second holding portion 112, the heating roller 61 can be located between the first holding portion 111 and the second holding portion 112 in the layer transfer device 1.

Since the lock member 140 is configured to engage with the base frame 110 by making use of the biasing force from the multilayer film F, the cost can be reduced in comparison, for example, with an alternative configuration in which a spring or the like is provided so as not to allow the restraining frame to rattle in the restraining position.

Since the transfer layer F22 can be seen through the second opening 120A of the restraining frame 120 and visually recognizable through the transparent supporting layer F1 and release layer F21, a user can be made unlikely to choose a wrong kind (color) of transfer layer F22 when changing the multilayer film F.

Since the size of the second opening 120A is defined as described above, interference of the multilayer film F with the edges of the second opening 120A can be restrained even when the roll diameter of the multilayer film F wound on the take-up reel 35 gradually increases.

Since the handles 114 protrude in a position shifted from the multilayer film F laid on the first guide shaft 41 and the second guide shaft 42 in a direction away from the first guide shaft 41 and the second guide shaft 42, a user grasping the handles 114 can be made unlikely to touch the multilayer film F.

The above-described embodiment can be modified in various manners for practical application, as will be described below.

In the above-described embodiment, the first guide shaft 41 as a whole is located in the region AR1 defined by causing the supply case 32 to be projected in the perpendicular direction perpendicular to the plane FF containing the rotation axes X1, X2; however, the first guide shaft 41 may be located partly in the region AR1.

In the above-described embodiment, the transfer layer F22 is explained as one which contains foil; however, the transfer layer may, for example, not contain foil or colorant, but may be formed of a thermoplastic resin.

In the above-described embodiment, the multilayer film F is of four layers, but the multilayer film may include any number of layers as long as it includes a transfer layer and a supporting layer.

In the above-described embodiment, the film unit FU comprising the holder 100 in which the film cartridge 200 is removably installable is illustrated by way of example, but may instead be a film unit with a film cartridge unremovably fixed in a holder, for example. In this alternative, an operator who is attaching, and unremovably fixing a supply reel to a frame of a film unit before shipping can be restrained from touching a transfer layer of a multilayer film wound on the supply reel.

In the above-described embodiment, the layer transfer device 1 is configured as a device separate from an image forming apparatus such as a laser printer, etc.; however, the layer transfer device may be configured as an integral unit combined with an image forming apparatus.

Although the above-described embodiment is configured such that the supply reel 31 and the take-up reel 35 are installable into and removable from the holder 100 in a direction perpendicular to the axial direction of the supply reel 31, another configuration may be feasible such that the supply reel and the take-up reel are installable into and removable from the holder along the axial direction of the supply reel.

In the above-described embodiment, the take-up gear 35C is illustrated as an example of a driving power transmission member; however, the driving power transmission member may, for example, be a coupling.

The elements described in the above embodiment and modified examples may be implemented selectively and in combination.

What is claimed is:

1. A film cartridge installable into and removable from a layer transfer device for transferring a transfer layer onto an image formed on a sheet, the film cartridge comprising:
a supply reel including a supply shaft on which a multilayer film including a supported layer with the transfer layer included therein and a supporting layer supporting the supported layer is wound, the supply reel including a supply gear provided at an end in an axial direction of the supply reel;
a take-up reel including a take-up shaft on which to take up the multilayer film; and
a supply case accommodating the supply reel,
wherein the multilayer film is wound on the supply shaft in such a manner that the supported layer is in contact with the supply shaft, and the multilayer film is wound on the take-up shaft in such a manner that the supported layer is in contact with the take-up shaft,
wherein the supply case includes two side walls provided at ends apart from each other in the axial direction, an outer side wall located, apart in the axial direction from one side wall of the two side walls that is closer to the supply gear, to cover at least part of the supply gear from the axial direction, and an outer peripheral wall connecting the one side wall and the outer side wall, and
wherein the supply gear, of which at least part is located between the one side wall and the outer side wall, is exposed to outside through an opening formed in the outer peripheral wall.

2. The film cartridge according to claim 1, wherein the supply reel is rotatably supported by the supply case.

3. The film cartridge according to claim 2, wherein the supply reel is rotatably supported on the side walls.

4. The film cartridge according to claim 1, wherein the outer side wall does not cover tops of gear teeth in an angular range of the opening of an angle α1 measured around a rotation axis of the supply reel as viewed with a line of sight aligned with the axial direction of the supply reel.

5. The film cartridge according to claim 1, wherein the outer side wall does not cover bottoms of gear tooth spaces in an angular range of the opening of an angle α1 measured around a rotation axis of the supply reel as viewed with a line of sight aligned with the axial direction of the supply reel.

6. The film cartridge according to claim 1, wherein the supply case is rotated about a rotation axis of the supply reel relative to a holder to thereby get installed therein, and
wherein an angle α1 of an angular range of the opening as measured around the rotation axis of the supply reel is greater than an angle α2 of rotation which the supply case makes when installed in the holder.

7. The film cartridge according to claim 1, wherein the take-up reel comprises a flange provided on each end of the take-up shaft, and a take-up gear located on an outer side of the flange in the axial direction of the take-up reel.

8. The film cartridge according to claim 7, wherein the take-up gear is located coaxially with the take-up shaft.

9. The film cartridge according to claim 1, wherein the supporting layer is transparent.

10. A foil film cartridge installable into and removable from a layer transfer device for transferring a transfer layer containing foil onto an image formed on a sheet, the foil film cartridge comprising:
a supply reel including a supply shaft on which a foil film including a supported layer with the transfer layer included therein and a supporting layer supporting the supported layer is wound; and
a take-up reel including a take-up shaft on which to take up foil film,
wherein the foil film is wound on the supply shaft in such a manner that the supported layer is in contact with the supply shaft, and the foil film is wound on the take-up shaft in such a manner that the supported layer is in contact with the take-up shaft.

11. The foil film cartridge according to claim 10, comprising a supply case accommodating the supply reel.

12. The foil film cartridge according to claim 11, wherein the supply reel is rotatably supported by the supply case.

13. The foil film cartridge according to claim 12, wherein the supply reel includes a supply gear provided at an end in the axial direction of the supply reel, and
wherein the supply gear is exposed to outside through an opening formed in the supply case.

14. The foil film cartridge according to claim 13, wherein the supply case includes two side walls provided at ends apart from each other in the axial direction, an outer side wall located, apart in the axial direction from one side wall of the two side walls that is closer to the supply gear, to cover at least part of the supply gear from the axial direction, and an outer peripheral wall connecting the one side wall and the outer side wall, and
wherein the supply gear, of which at least part is located between the one side wall and the outer side wall, is exposed to outside through an opening formed in the outer peripheral wall.

15. The foil film cartridge according to claim 14, wherein the supply reel is rotatably supported on the side walls.

16. The foil film cartridge according to claim 14, wherein the outer side wall does not cover tops of gear teeth in an angular range of the opening of an angle α1 measured around a rotation axis of the supply reel as viewed with a line of sight aligned with the axial direction of the supply reel.

17. The foil film cartridge according to claim 14, wherein the outer side wall does not cover bottoms of gear tooth spaces in an angular range of the opening of an angle α1 measured around a rotation axis of the supply reel as viewed with a line of sight aligned with the axial direction of the supply reel.

18. The foil film cartridge according to claim 14, wherein the supply case is rotated about a rotation axis of the supply reel relative to a holder to thereby get installed therein, and
wherein an angle α1 of an angular range of the opening as measured around the rotation axis of the supply reel is greater than an angle α2 of rotation which the supply case makes when installed in the holder.

19. A film unit comprising:
a foil film cartridge according to claim 11;
a holder which is configured to support the supply reel and the take-up reel, and in which the supply case is removably installable;
a first guide shaft configured to contact the supporting layer of the foil film drawn out from the supply reel and change a traveling direction of the foil film;
a second guide shaft configured to contact the supporting layer of the foil film guided by the first guide shaft and change the traveling direction of the foil film; and
an installation/removal guide configured to guide the supply case along a predetermined direction when the supply case is installed into and removed from the holder, wherein a direction of movement of the supply case guided by the installation/removal guide when the supply case is removed from the holder is a direction of a vector which does not contain a component of a vector a direction of which is opposite to a direction in which the foil film is drawn out from the supply reel.

20. The film unit according to claim 19, wherein the first guide shaft is located out of a region defined by causing the supply case to be projected in the predetermined direction.

21. The film unit according to claim 20, wherein at least part of the first guide shaft is located in a region defined by causing the supply case to be projected in a perpendicular direction perpendicular to a plane containing a rotation axis of the supply reel and a rotation axis of the take-up reel.

22. The film unit according to claim 19, wherein the supply case comprises an engageable portion having an elongate shape,
wherein the installation/removal guide comprises:
a guide groove configured to guide the engageable portion along the predetermined direction; and
a holding hole having a shape of a circle, connected to the guide groove, and configured to hold the engageable portion in a manner that permits the engageable portion to rotate,
wherein the guide groove has a width smaller than a longer side of the engageable portion, and greater than a shorter side of the engageable portion, and
wherein the holding hole has a diameter greater than the longer side of the engageable portion.

23. The film unit according to claim 22, wherein the holder comprises a restraining portion that restrains rotation of the supply case with the engageable portion held in the holding hole, and
wherein a longitudinal direction of the engageable portion of the supply case of which rotation is restrained by the restraining portion is nonparallel to the predetermined direction.

24. The film unit according to claim 23, wherein the supply case comprises a first opening through which to draw out the foil film of the supply reel to outside,
wherein the first opening has an upstream end and a downstream end located downstream from the upstream end in a direction of rotation of the supply reel,
wherein when the rotation of the supply case is restrained by the restraining portion, the downstream end is located between the foil film positioned along an internal common tangent of the first guide shaft and the supply shaft and an external common tangent of the first guide shaft and the supply shaft, the external common tangent being one located farther than the other from the take-up reel.

25. The film unit according to claim 22, wherein the holder comprises a boss to be guided by a guide of the layer transfer device, and
wherein the boss and the engageable portion are located on a rotation axis of the supply reel.

26. The foil film cartridge according to claim 10, wherein the take-up reel comprises a flange provided on each end of the take-up shaft, and a take-up gear located on an outer side of the flange in the axial direction of the take-up reel.

27. The foil film cartridge according to claim 26, wherein the take-up gear is located coaxially with the take-up shaft.

28. The foil film cartridge according to claim 10, wherein the supporting layer is transparent.

29. A film unit comprising:
a foil film cartridge according to claim 10;
a holder configured to support the supply reel and the take-up reel;
a first guide shaft configured to contact the supporting layer of the foil film drawn out from the supply reel and change a traveling direction of the film; and
a second guide shaft configured to contact the supporting layer of the foil film guided by the first guide shaft and change the traveling direction of the foil film.

30. The film unit according to claim 29, wherein the supply reel and the take-up reel are installable into and removable from the holder.

31. The film unit according to claim 30, wherein the supply reel and the take-up reel are installable into and removable from the holder along a direction perpendicular to an axial direction of the supply reel.

32. The film unit according to claim 29, comprising a third guide shaft configured to contact the supported layer of the foil film guided by the second guide shaft, and change a traveling direction of the foil film toward the take-up reel, and
wherein the third guide shaft is movable between:
a first position, closer to the supply reel than, that is on a supply reel side with respect to, a straight line connecting a center of the take-up shaft and a center of the second guide shaft; and
a second position that is on a side opposite to the supply reel side with respect to the straight line, and far apart from the second guide shaft at a distance greater than a maximum roll diameter of the foil film wound on the take-up reel.

33. The film unit according to claim 32, wherein the holder comprises a base frame, and a restraining frame movably supported by the base frame,
wherein the restraining frame comprises the third guide shaft, and is movable between a restraining position in which restraint is placed on movement of the take-up reel in installation/removal directions, and a release position in which the restraint on the movement of the take-up reel is lifted, and
wherein when the restraining frame is in the restraining position, the third guide shaft is in the first position; when the restraining frame is in the release position, the third guide shaft is in the second position.

34. The film unit according to claim 33, wherein the base frame comprises a first holding portion configured to hold the supply reel, a second holding portion configured to hold the take-up reel, and a connecting portion connecting the first holding portion and the second holding portion, and
wherein the connecting portion is located off a plane containing a rotation axis of the supply reel and a rotation axis of the take-up reel to one side.

35. The film unit according to claim 33, comprising a lock member provided on the restraining frame, the lock member being configured to engage with the base frame to restrain the restraining frame from moving from the restraining position to the release position, and
wherein a biasing force applied from the foil film to the third guide shaft causes the lock member to be biased toward the base frame.

36. The film unit according to claim 33, wherein the restraining frame comprises one end located farthest from the supply reel when the restraining frame is in the restraining position, and
wherein the one end comprises an opening through which the take-up reel is exposed to outside.

37. The film unit according to claim 36, wherein the base frame comprises at an outer surface thereof a first surface which is located in a position shifted in a perpendicular direction perpendicular to a plane containing a rotation axis of the supply reel and a rotation axis of the take-up reel, on one side relative to the third guide shaft which is a same side as that on which the rotation axis of the take-up reel is located, the position being distanced farther than the rotation axis of the take-up reel from the third guide shaft, wherein the restraining frame is rotatable relative to the base frame about a rotation axis distanced farther than the rotation axis of the take-up reel from the third guide shaft in the perpendicular direction, wherein the take-up reel comprises a farthest portion which is located farthest from the supply reel, and wherein the one end of the restraining frame is closer than the farthest portion to the supply reel when the restraining frame is in the restraining position.

38. The film unit according to claim 37, wherein the opening is wider than a width of the foil film, wherein the opening has edges among which an edge oppositely laid across an outer surface of the foil film is positioned such that a distance therefrom to the rotation axis of the take-up reel is greater than a maximum roll radius of the foil film wound on the take-up reel.

39. The film unit according to claim 29, wherein the holder comprises handles at opposite ends thereof apart from each other in an axial direction of the take-up reel.

40. The film unit according to claim 39, wherein the handles protrude in a position shifted from the foil film laid on the first guide shaft and the second guide shaft, in a direction away from the first guide shaft and the second guide shaft.

41. The film unit according to claim 29, which is installable into and removable from the layer transfer device along a direction perpendicular to an axial direction of the supply reel.

42. The film unit according to claim 29, comprising a driving power transmission member configured to receive a driving power from a driving source provided in the layer transfer device, and transmit the driving power to the take-up reel.

43. The film unit according to claim 29, wherein the second guide shaft is located in a position farther than the first guide shaft from the supply reel in a perpendicular direction perpendicular to a plane containing a rotation axis of the supply reel and a rotation axis of the take-up reel.

44. A layer transfer device having a housing that allows a film unit according to claim 22 to be installed therein and removed therefrom, the layer transfer device comprising:

a heating member configured to heat the foil film; and a pressure member configured such that the foil film is nipped between the pressure member and the heating member, wherein the housing comprises a housing main body having an opening, and a cover configured to open and close the opening, and wherein the pressure member is provided in the cover.

* * * * *